United States Patent [19]
Muller et al.

[11] Patent Number: 6,075,589
[45] Date of Patent: Jun. 13, 2000

[54] DEVICE FOR THE GEOMETRIC MEASUREMENT AND INSPECTION OF WHEELED VEHICLES

[75] Inventors: Patrice Muller, Chartres; Denis Douine, Lagny sur Marne, both of France

[73] Assignee: Muller Bem, Chartres, France

[21] Appl. No.: 08/691,896

[22] Filed: Aug. 1, 1996

[30] Foreign Application Priority Data

Aug. 2, 1995 [FR] France .................................. 95 09413

[51] Int. Cl.[7] .............................. G01B 11/26; G01B 5/24
[52] U.S. Cl. ..................................... 356/139.09; 33/203.12
[58] Field of Search ..................... 356/139.09; 33/203.12, 33/203.18

[56] References Cited

U.S. PATENT DOCUMENTS

| | | | |
|---|---|---|---|
| 3,951,550 | 4/1976 | Slick | 356/141.5 |
| 5,018,853 | 5/1991 | Hechel et al. | 356/155 |
| 5,519,489 | 5/1996 | McClenahan et al. | 356/139.09 |

FOREIGN PATENT DOCUMENTS

| | | |
|---|---|---|
| 0 386 401 | 9/1990 | European Pat. Off. . |
| 0 495 190 | 7/1992 | European Pat. Off. . |
| 0 528 552 | 2/1993 | European Pat. Off. . |
| 2 711 238 | 4/1995 | France . |
| WO 95/15479 | 6/1995 | WIPO . |

*Primary Examiner*—Stephen C. Buczinski
*Attorney, Agent, or Firm*—Young & Thompson

[57] ABSTRACT

A device for geometric measurement and inspection of wheeled vehicles includes structure for determining physical parameters usable for computation of the angles and distances characteristic of the vehicles to be inspected. Each device for determining a physical parameter includes at least one substantially horizontal light beam emitted by a light source, at least one image forming device of this source on an optical linear detector, and at least one optical linear detector, preferably of the CCD or PSD type, adapted to receive at least two substantially horizontal light beams from at least two separate sources.

24 Claims, 18 Drawing Sheets

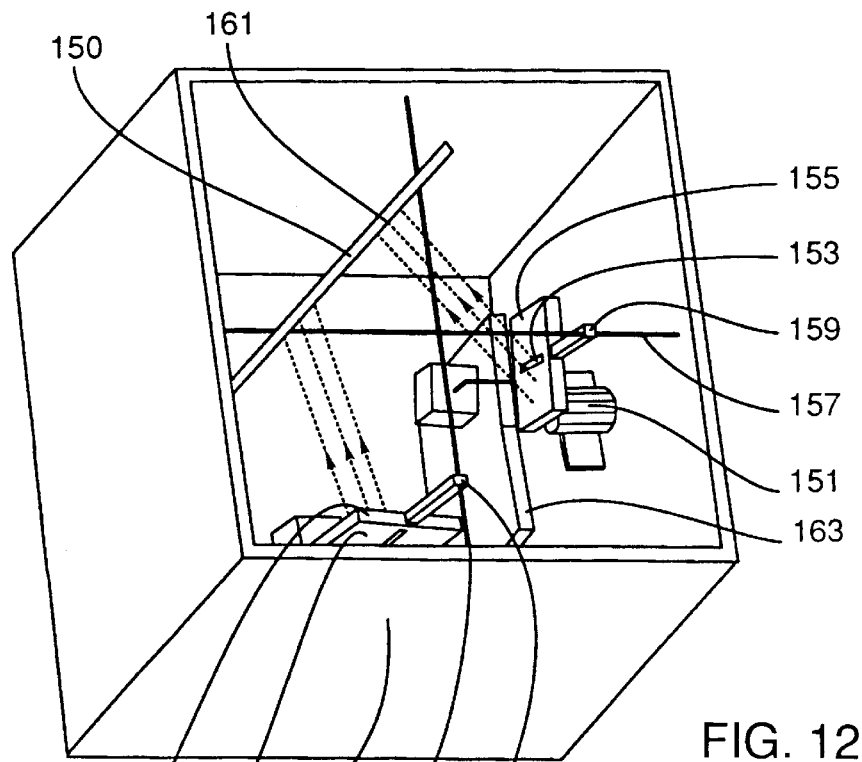
FIG. 12A
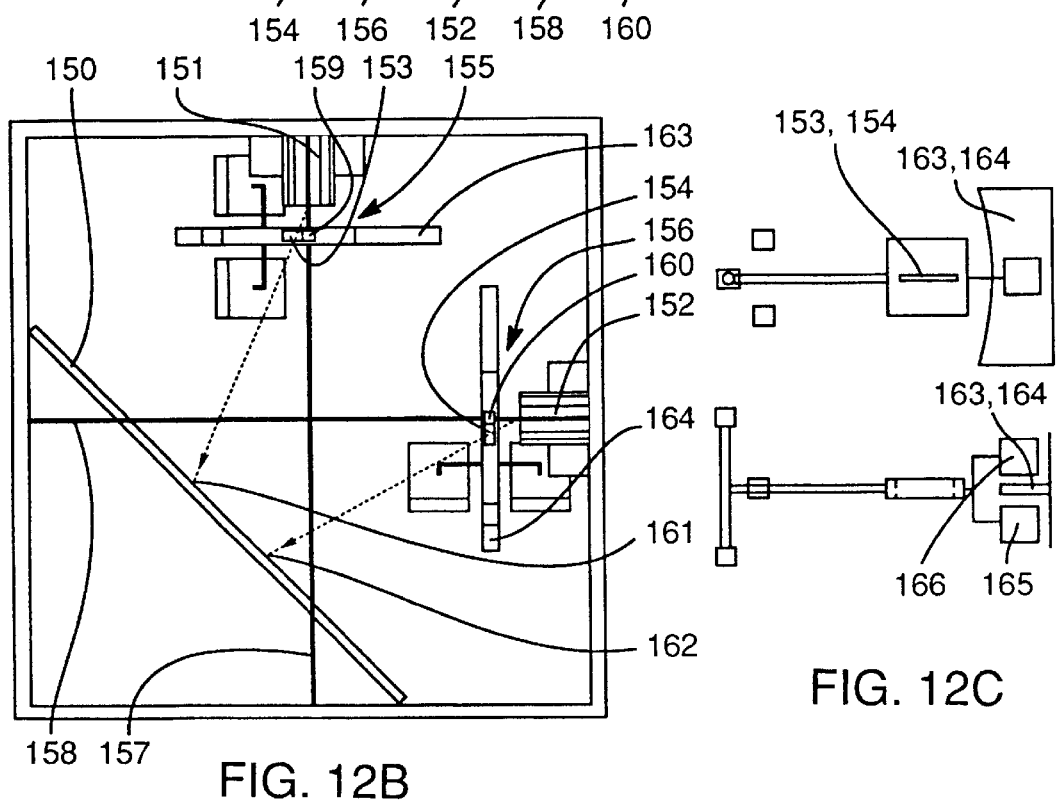
FIG. 12B
FIG. 12C

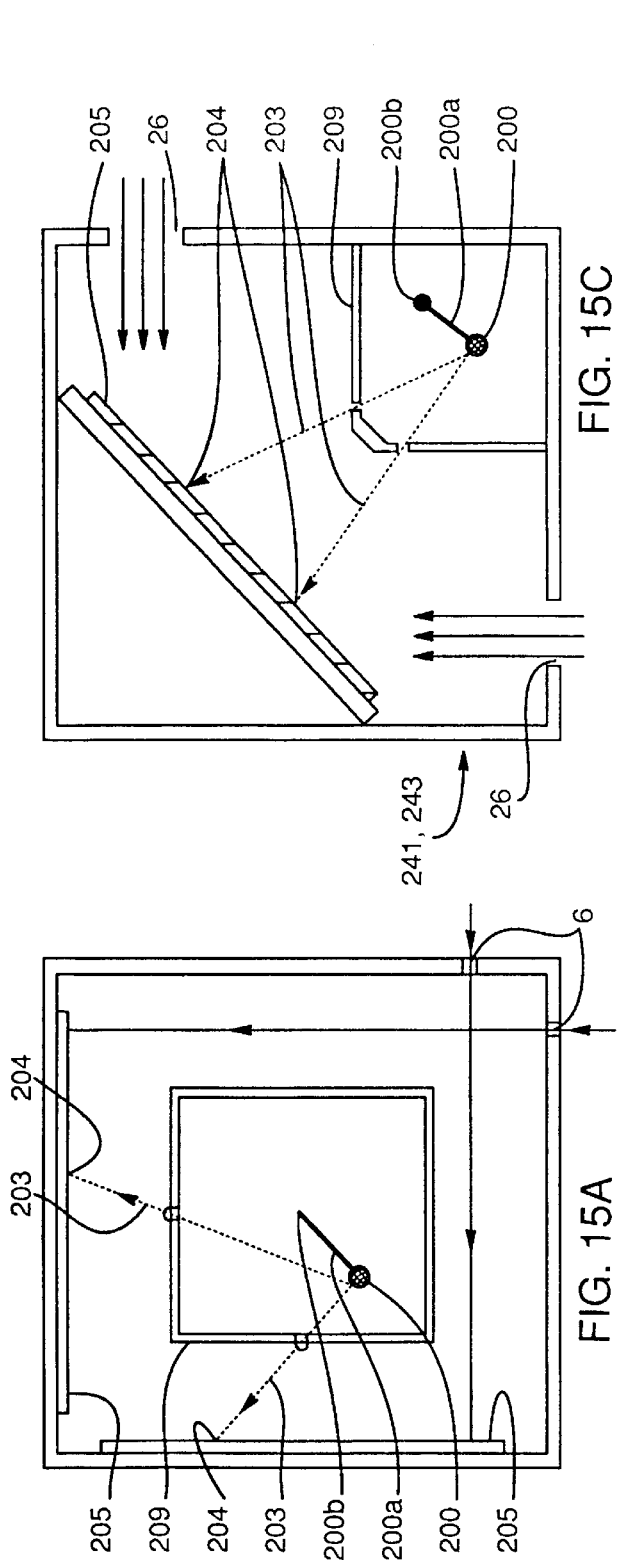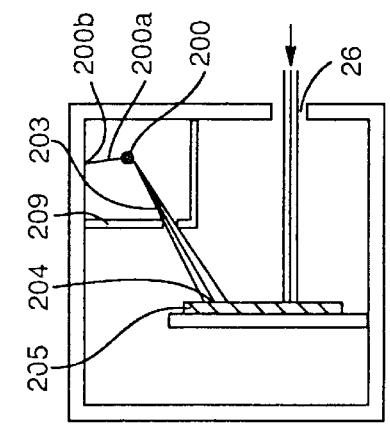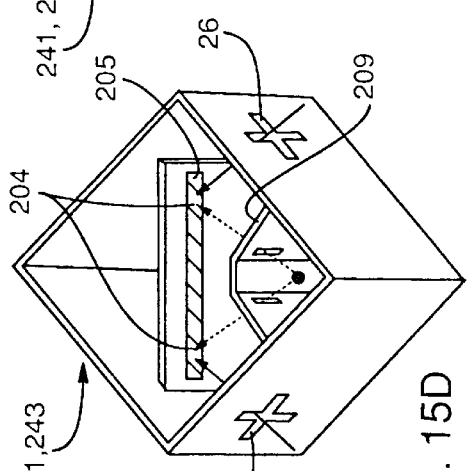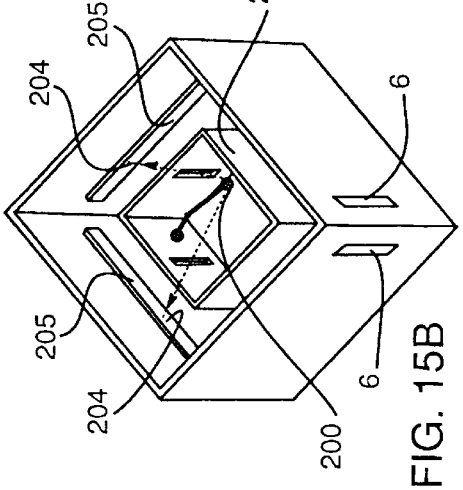

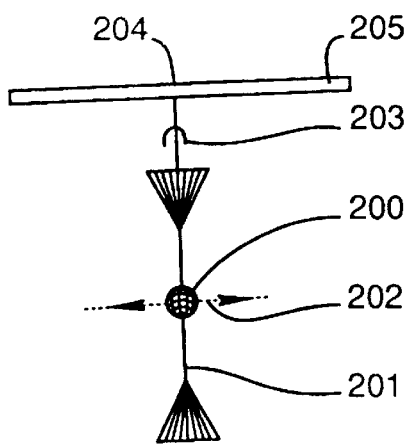
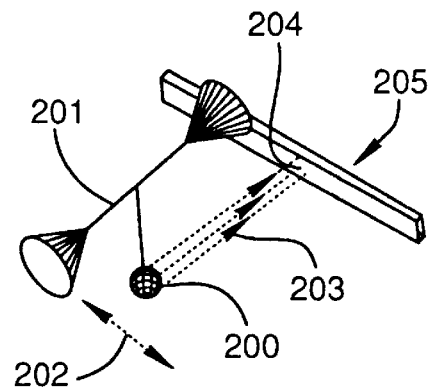
FIG. 16A　　　　　　FIG. 16B
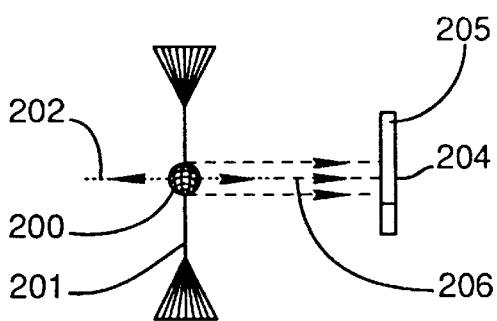
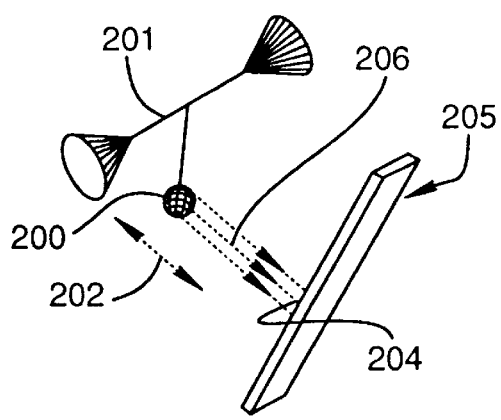
FIG. 17A　　　　　　FIG. 17B
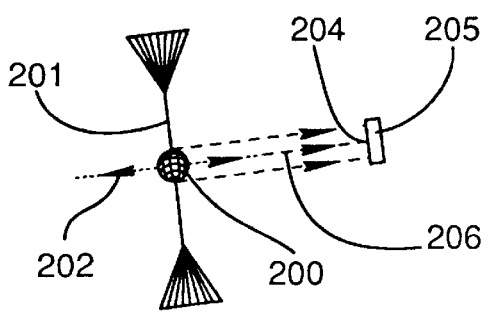
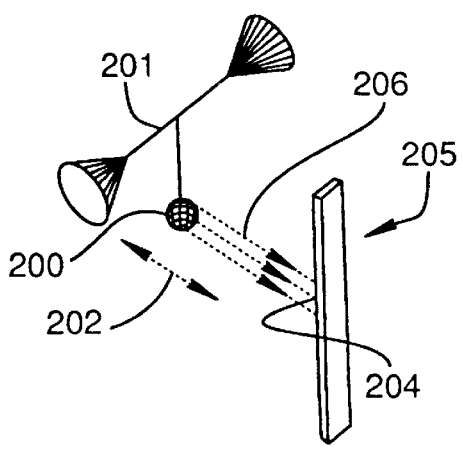
FIG. 18A　　　　　　FIG. 18B

DEVICE FOR THE GEOMETRIC MEASUREMENT AND INSPECTION OF WHEELED VEHICLES

BACKGROUND OF THE INVENTION

The invention relates to a device for the geometric measurement and inspection of wheeled vehicles.

DESCRIPTION OF THE RELATED ART

Known devices of this type generally comprise several housings or measuring heads secured to the wheels of the vehicle to be inspected, for determining the physical parameters representative of the individual geometric position of a wheel relative to a predetermined vertical plane or relative to a predetermined horizontal plane, as well as the physical parameters representative of relative geometric positions of a wheel relative to another wheel of the same vehicle.

There are known in particular devices sold under reference 8675 by the French company MULLER BEM, in which four housings or measuring heads comprising linear optical detectors, inclinometers and potentiometers, communicate with a measuring or computing CPU to determine with the aid of a control program and computation, the physical parameters and the characteristic values of the geometry of an inspected vehicle.

These known devices are completely satisfactory, but have the drawback of requiring a number of optical linear detectors equal to the number of physical parameters to be inspected, which gives rise to a relatively high overall cost of the device because of the high price of the linear optical detectors of the CCD (charge coupled device) or PSD (position sensitive detector) type.

The document EP 0 386 401 B1 discloses a positioning or alignment measuring device for wheels with measuring heads disposed on the wheels of the vehicle. This device comprises a single line of detectors which is arranged in a region of intersection of horizontal radiation and vertical radiation for the contactless determination of horizontal and vertical angles. The means for determining the horizontal angles has a reference radiation source arranged outside the measuring head with horizontal radiation, the vertical angle determining means has a pendulous axle suspended freely movably about an axis on the measuring head with a vertical radiation source and a line of detectors for the vertical radiation. The two lines of detectors for the horizontal radiation and for the vertical radiation are constituted by a single row of detectors which is arranged in the above-identified intersection zone.

This device thus has an advantage of using a single detector to determine the physical parameters from a horizontal radiation and from a vertical radiation. However, this device has the drawback of requiring at least as many optical linear detectors of the CCD type as the substantially horizontal radiations. Thus, for complete equipment comprising four arms fixed to the four wheels of a vehicle, it is necessary to provide at least eight optical linear detectors.

Moreover, in this zone device, it is as a practical matter necessary to arrange the optical linear detector or line of detectors in a predetermined position along a line perpendicular to the plane of radiation of the measurement lines and at an angle of reception predetermined by the direction of the measurement lines. The presence of horizontal and vertical radiations thus prevents the positioning of the detector so as to obtain maximum sensitivity of detection and has moreover the drawbacks of a relatively large volume of casing or a measuring head and the difficulty of discriminating between the spot image produced by a horizontal radiation and the spot image produced by a vertical radiation on the same optical linear detector.

SUMMARY OF THE INVENTION

The invention has for its object to overcome the above drawbacks, by providing a new measuring device having a lower number of optical linear detectors, adapted to be oriented according to their angle of maximum sensitivity, and using substantially horizontal light rays from a source external or internal to each measuring housing.

The invention has for its object a device for the geometric measurement and inspection of wheeled vehicles, of the type comprising means for determining physical parameters usable for the computation of the angles and distances characteristics of the vehicles to be inspected, each physical parameter determination means comprising in combination: at least one substantially horizontal light ray emitted by a source of luminous emission, at least one means for forming an image of said source on an optical linear detector, and at least one optical linear detector, preferably of the CCD (charge coupled device) or PSD (position sensitive detector) type, adapted to receive at least two substantially horizontal light rays from at least two separate sources.

According to other characteristics of the invention, an optical linear detector located within a casing is sensitive to at least two substantially horizontal light rays produced by two sources arranged outside the housing.

the device comprises four measuring housings disposed according to a "regular" configuration.

the device comprises four measuring housings arranged according to a "crossed" configuration.

the device comprises four measuring housings arranged for measurement of physical parameters according to two diagonals of the quadrilateral formed by the housings.

the means for forming an image of the luminous emission source are arranged for measuring the relative heights of the casings with respect to each other.

the means for forming an image of the luminous emission source comprise at least one cruciform slot or two perpendicular slots.

the casings are all located at the end of arms extending outwardly of the vehicle.

the casings are all located at the end of arms extending inwardly of the vehicle.

the casings are located at the end of arms extending forwardly of the vehicle.

the casings are arranged at the ends of arms extending rearwardly of the vehicle.

the casings are disconnectable or dismountable mechanically relative to the mounting arms, so as to change the configuration of mounting on the vehicles to be inspected.

at least one optical linear detector receives at least one substantially horizontal radiation arranged to determine the physical parameters permitting the computation of vertical angles of inclination.

each substantially horizontal radiation is emitted by a source of luminous emission freely mounted pivotally about an axle fixed relative to said optical linear detector.

each horizontal radiation is emitted by a source of luminous emission mounted pendulously from a point fixed relative to said optical linear detector.

each horizontal radiation is emitted by a source of luminous emission mounted in fixed position relative to said optical linear detector and is reflected, diaphragmed or focussed by a corresponding member before illuminating said optical linear detector.

said member is a mirror or like reflecting member mounted pivotally about an axle fixed relative to said source and relative to said optical linear detector.

said member is a mask having at least one slot for defining an image mounted pivotally about an axle fixed relative to said source and relative to said optical detector.

said mask comprises two slots for defining an image.

said mask is in the form of a box comprising two slots disposed on two separate surfaces of the box.

the mask is suspended by a Cardan mounting, with two degrees of pivotal freedom.

each substantially horizontal radiation is emitted by a source of luminous emission mounted at the end of a flexible strap permitting pivoting, whose other end is seated in fixed position relative to said optical linear detector.

said corresponding member is fixed on a flexible resilient blade seated at one end in fixed position relative to said optical linear detector and bearing at its other end a counterweight.

the device comprises four optical linear detectors each disposed in a casing and two inclinometers with a double axis disposed in two diagonally opposed casings, so as to minimize the total number of detectors used.

BRIEF DESCRIPTION OF THE DRAWINGS

The invention will be better understood from the description which follows given by way of non-limiting example with reference to the accompanying drawings, in which:

FIGS. 12A and 12B show schematically and respectively a perspective view and a plan view of another casing or measuring head of a device according to the invention.

FIG. 12C shows schematically and respectively a front elevational view and a side elevational view of a hanger for a device according to FIGS. 12A and 12B.

FIGS. 15A and 15B show schematically and respectively a plan view and a perspective view of another measuring arrangement according to the invention.

FIGS. 15C to 15E show schematically and respectively a plan view, a perspective view and a diagonal cross section of another measuring arrangement according to the invention.

FIGS. 16A and 16B show schematically a plan view and a perspective view of a measuring arrangement according to the invention.

FIGS. 17A and 17B show schematically in plan view and perspective view another example of a measuring arrangement according to the invention.

FIGS. 18A and 18B show schematically a plan view and a perspective view of another measuring arrangement according to the invention.

DESCRIPTION OF THE PREFERRED EMBODIMENT

Figure 1A:
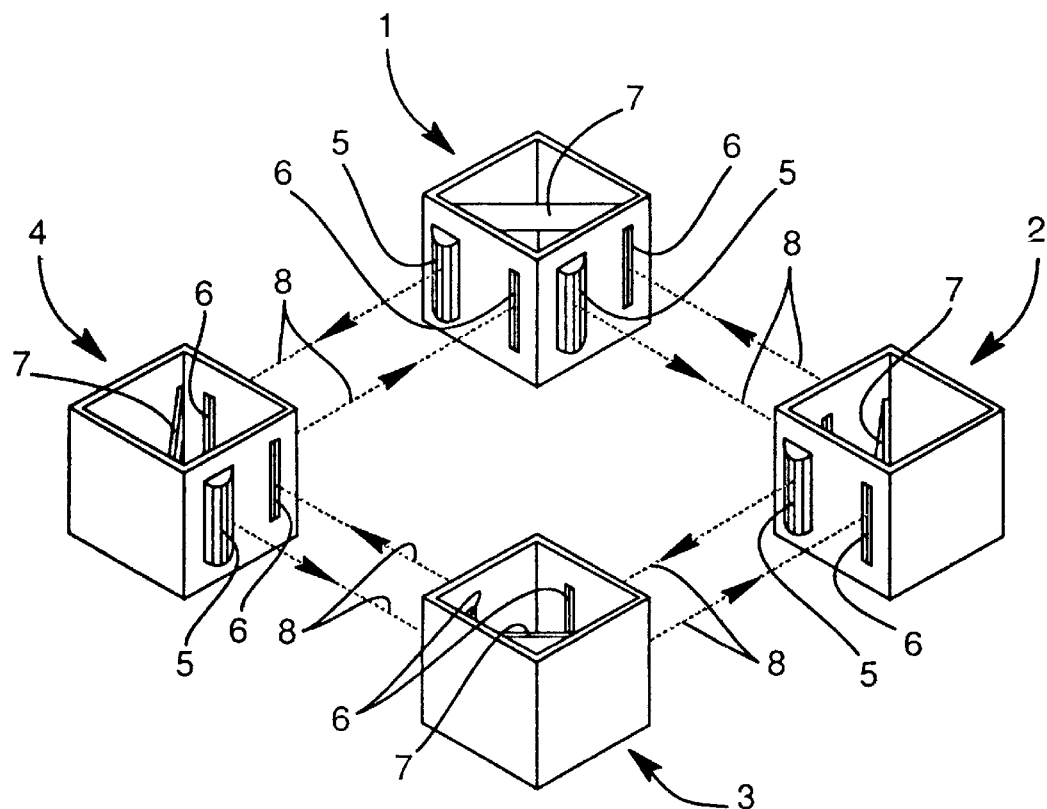
FIGS. 1A and 1B represent schematically and respectively a perspective view and a plan view of an arrangement of four casings or measuring heads according to the invention.
Figure 1B:
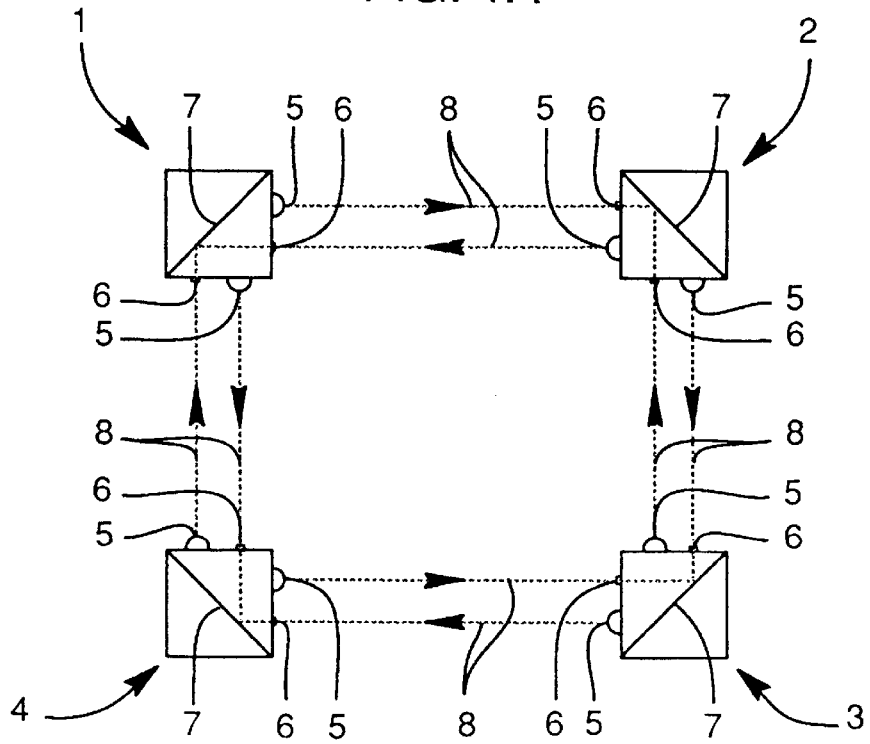

Referring to FIGS. 1A and 1B, a geometric inspection device comprises four casings 1 to 4, if desired identical for economy of production, adapted each to be mounted on a automotive vehicle wheel by means of hooks of a type known per se (not shown) and to communicate with a central control in the form of a CPU (not shown).

Each casing 1 to 4 of substantially cubical form comprises at least one luminous radiation source 5 and at least one image definition means 6, of the type of a slot, a cylindrical lens or the like adapted to form an image of the source on a suitable detector 7 of the CCD type (charge coupled device), PSD (position sensitive detector) or the like. In this example, each casing 1 to 4 comprises two luminous emission sources 5 and two image definition means 6.

This arrangement thus permits with a single detector 7, detecting two horizontal luminous radiations 8. In the calibrating position shown in FIGS. 1A and 1B, each detector 7 is for example struck at the same point by two incident luminous radiations 8 when the casings 1 to 4 are disposed at the apices of a rectangle: this arrangement ensures calibration of the right angles. In a measuring and inspection position for the geometry of a vehicle (not shown), each detector 7 is generally struck at separate points by incident luminous radiations 8.

Moreover, in the case of vehicles having very small wheel setbacks, this wheel setback appears immediately on the optical detectors 7 as a quantity proportional to the spacing of the two luminous spots formed on the detector 7 and inversely proportional to the cosine of the angle formed by the linear detector 7 with the optical axis of the incident beam 8.

Each detector 7 is preferably oriented parallel to a diagonal plane of the corresponding casing 1 to 4, but this arrangement is not imperative: the invention also covers the case in which the detectors 7 are oriented according to different angles with the directions of luminous radiation 8.

This first arrangement according to the invention is adapted to "regulate" and has a configuration in which each effective luminous radiation 8 does not cross another effective luminous radiation 8 outside the casings 1 to 4.

Preferably, the two slots 6 or image definition means of a same casing 1 to 4 have a different width and permit identifying the origin of the luminous radiation 8 whose image is formed on the optical detector 7. This mode of discrimination has been described in French patent FR 2.711.238 in the name of the applicant of the present application.

Alternatively, the emission of two luminous sources 5 whose images are formed on a same optical detector 7 is time discriminated by using sequencing. In the embodiment shown, two steps are necessary for this purpose: a first step, in which all the luminous sources that are the closest to the inside of the device (internal emission paths in the counter-clockwise direction) are caused to emit and, in a second step, all the luminous sources 5 the most external to the device (outside emission paths in the clockwise direction) are caused to emit.

Because of the arrangement shown, the sum of the horizontal orientation angles is equal to six flat angles (6 π in radians). The control and computation program continuously verifies this sum and signals any anomaly in the case of error of addition. The program also permits storing the systematic errors due to the device itself (orthogonality of the detectors) and the triggering of the specific procedures connected to the errors due to the vehicle: inspection of the development of the parameters of a given vehicle by comparison to the parameters of the data bank relative to this vehicle, inspection of the development of the parameters of a given wheel with comparison to the parameters of the data bank relative to this vehicle, inspection of the development of the parameters of a given vehicle in comparison to the family of vehicles of the same type and automatic signaling to the manufacturer upon exceeding production tolerances.

Figure 2A:
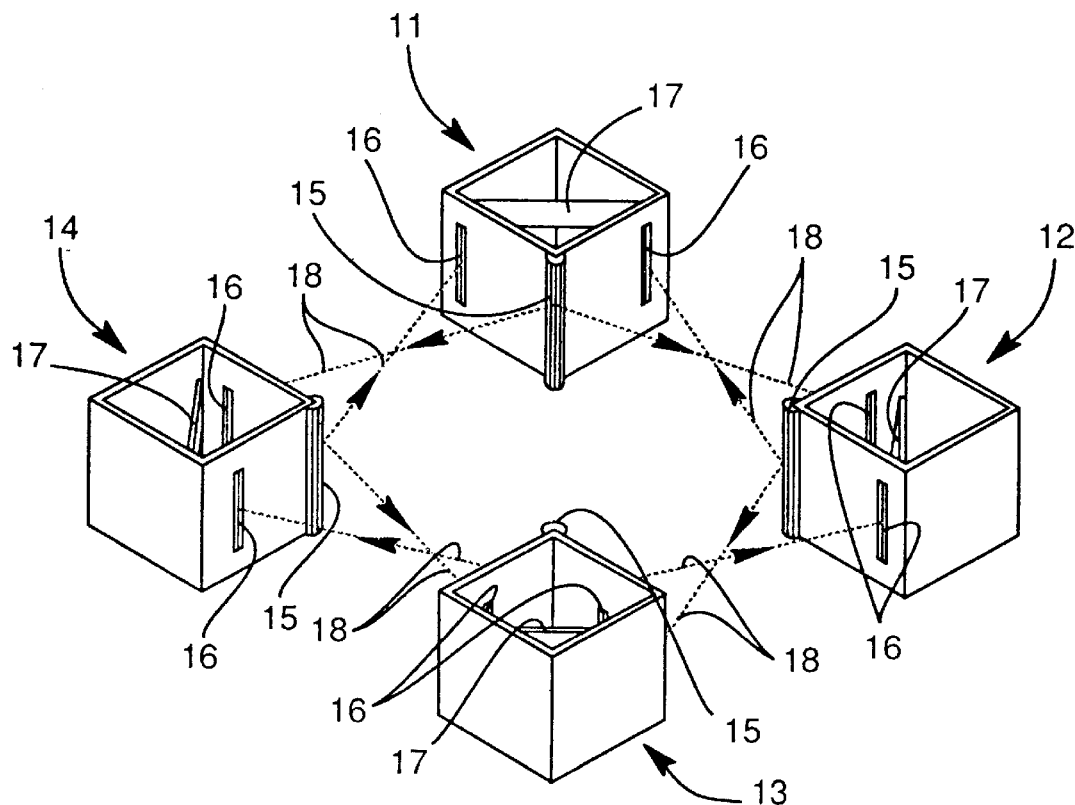
FIGS. 2A and 2B show schematically and respectively a perspective view and a plan view of another arrangement of four casings or measuring heads according to the invention.
Figure 2B:
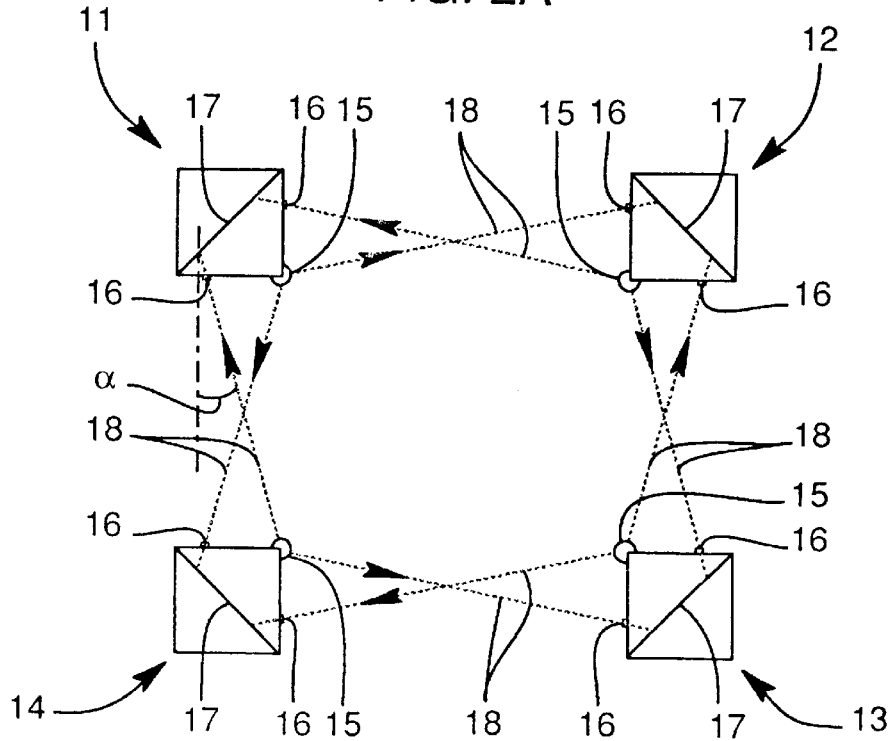

Referring to FIGS. 2A and 2B, another embodiment of the invention comprises a device having four casings 11 to 14.

Each measuring casing 11 to 14 comprises a single luminous emission source 15 and at least two image definition means 16. This second arrangement according to the invention is "crossed" with reference to the crossing of the optical axes of the luminous radiations 18 striking the optical detectors 17.

The discrimination of the light rays 18 can be carried out because the light rays 18 strike the corresponding linear optical detector 17 at separate points separated by a distance greater that the distance separating the luminous emission source 15 from a slot 16 of a same casing 11 to 14. One can thus carry out a time discrimination or geometric discrimination (different widths of slots).

In the calibrating arrangement shown in FIGS. 2A and 2B, each detector 17 is struck by two luminous radiations at two separate points when the casings 1 to 4 are arranged at the corners of a rectangle. Contrariwise, the luminous emission path in the clockwise direction and in the counter-clockwise direction are offset relative to the positioning rectangle of the casings 11 to 14 by negative angles of a value $\alpha_i$ (i=1 to 4) and positive angles of a value $\alpha_i$ (i=1 to 4), respectively (the positive direction chosen for the angles is conventionally counterclockwise). These angles $\alpha_i$ are variable and depend on the track and wheel base. To eliminate these parasitic angles of measurement, one measures the tracks and the wheel bases and one computes the angles $\alpha_i$ according to the formula: $\alpha_i = \text{Arctan}(a/b_i)$, in which a is the distance from the corresponding slot to the light source, and $b_i$ is the corresponding track or wheel base in the direction of measurement: transverse or longitudinal, left or right.

In this example, each linear detector 17 is parallel to a diagonal plane of the geometric cube of each casing 11 to 14. of course, any other functional arrangement of the detectors 17 will not depart from the scope of the present invention: in particular, each linear detector 17 can preferably be oriented parallel to a plane orthogonal to the diagonal of a rectangle having the usual dimensions of a vehicle.

To avoid optical interference, one can discriminate timewise the luminous radiations by a sequence of two steps: in a first step, the diagonally opposed luminous emission sources 15 are active and, in a second step, the other luminous emission sources 15 located on the other diagonal are active.

Figure 3A:
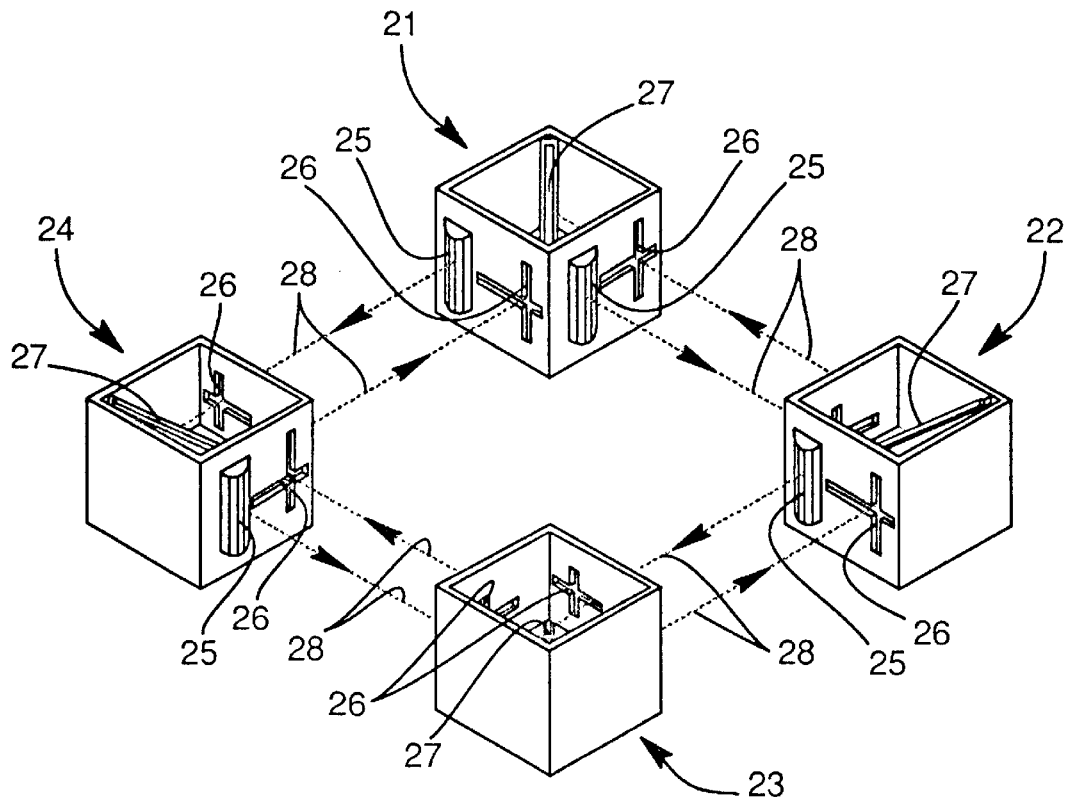
FIGS. 3A and 3B show schematically and respectively a perspective view and a plan view of another arrangement of four casings according to the invention.
Figure 3B:
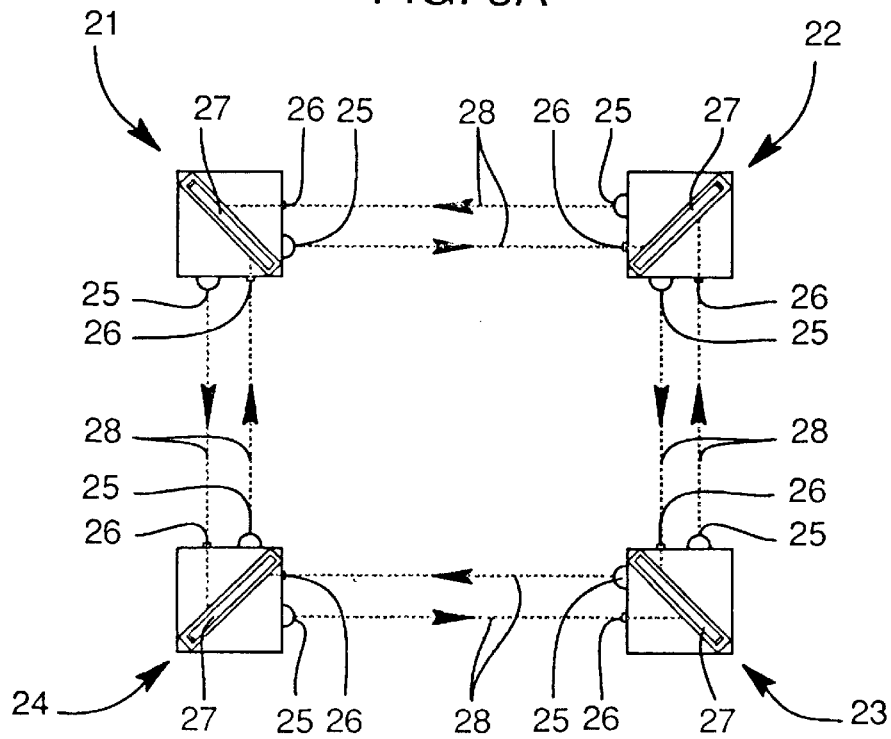

Referring to FIGS. 3A and 3B, another device according to the invention comprises four casings 21 to 24. Each casing 21 to 24 comprises two luminous emission sources 25, two image definition means 26 and an optical linear detector 27. The overall arrangement is of the "regular" type with a configuration of effective optical axes analogous to that of FIGS. 1A and 1B, which gives rise to the same operative advantages as those of FIGS. 1A and 1B.

In this example, each image definition means 26 is cruciform (for example a cross-shaped slot formed by two perpendicular slots), so as to give the relative altitudes of the different casings 21 to 24 and to determine by the least squares method a substantially horizontal geometric reference plane by computation to determine the angles of the horizontal planes. The relative altitude evaluation method and utilization of an image definition means in the form of a cross have already been disclosed in FR 2.711.238 in the name of the present application.

In this example, each optical linear detector 27 is disposed in the plane of symmetry of the geometric cube of each casing 21 to 24 and is inclined relative to the horizontal by a certain angle, so as to increase the definition and precision of measurement, in a manner known per se.

For the discrimination of luminous radiations 28, there is used both the difference of the widths of the horizontal slots and of the vertical slots, and the time sequence in two steps described with reference to FIGS. 1A and 1B.

Figure 4A:
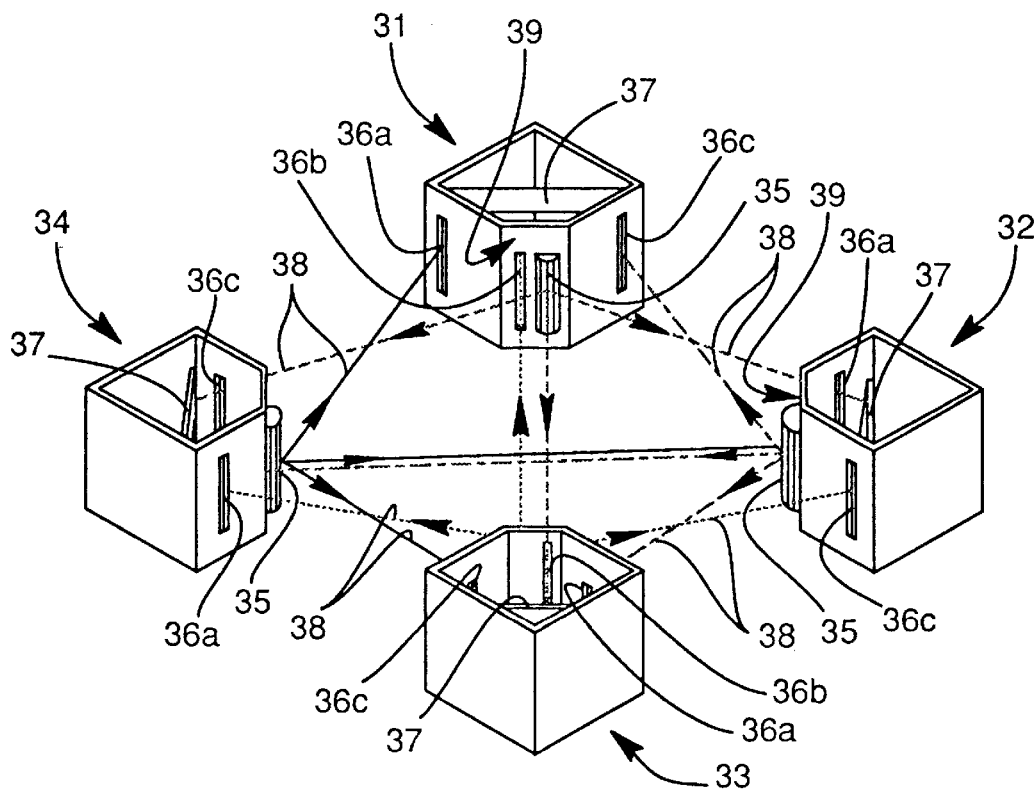
FIGS. 4A and 4B show schematically and respectively a perspective view and a plan view of another arrangement of four casings according to the invention.
Figure 4B:
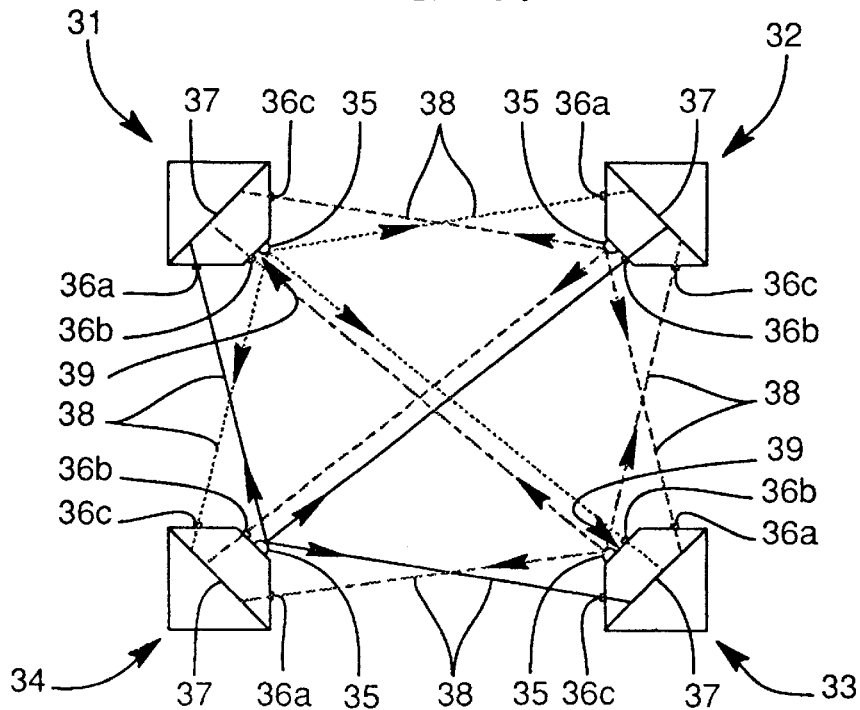

With reference to FIGS. 4A and 4B, another geometric inspection device comprises four casings 31 to 34.

Each measuring casing 31 to 34 comprises a single luminous emission source 35, three image definition means 36 each constituted preferably by three vertical slots 36a, 36b and 36c, as well as a linear optical detector 37. This other arrangement according to the invention is of the "crossed" type with an effective arrangement of optical axes comprising that disclosed with reference to FIGS. 2A and 2B, which gives rise to the same operative advantages as those present in FIGS. 2A and 2B (discrimination of the luminous radiations 38 effected by construction, in particular).

In this example, the vertical slots 36b are disposed substantially along the diagonals of the working configuration of mounting on a standard vehicle. This preferred arrangement ensures a supplemental precision by permitting intermediate "triangular" summations involving only three detectors, the peripheral summations and cross summations according to a Z-shaped path. The effectuated corrections can thus be attributed to each casing 31 to 34, individually such that the control program of the device stores in memory the individual parameters of each casing usable for the computation and verifies the permanence of these individual parameters to determine if it is necessary to revise the structure, replace the electronic components or calibrate the transfer functions of a casing 31 to 34.

In a preferred manner, each casing 31 to 34 has a substantially cubical form having a plane of truncation 39 on the inner side. The plane 39 thus defined serves to support the luminous emission source 35 and to support the slot 36b oriented diagonally and vertically.

Preferably, the discrimination of the luminous radiations is effected by time sequencing in four steps in which, in each step, a single luminous emission source is active. When a rapid balance is effected at the end of verification of the geometry of the vehicle, there is used a simplified time sequencing of two steps: in the first step, two sources 35 located on a same diagonal are active whilst, in the second step, the two other sources located on the other diagonal are active. However, in this simplified mode of sequencing, it is necessary to carry out a verification program and from three to eight measurements from amongst twelve measurements to determine the corresponding emission sources and to eliminate errors of discrimination of spots resulting from the impossibility of distinguishing the emission source 35 at the origin of an image from among three formed on the optical linear detector 37 of a casing 31 to 34. This elimination is rendered possible by taking as primary references the optical axes corresponding to the diagonals passing through the slots 36b.

Figure 5A:
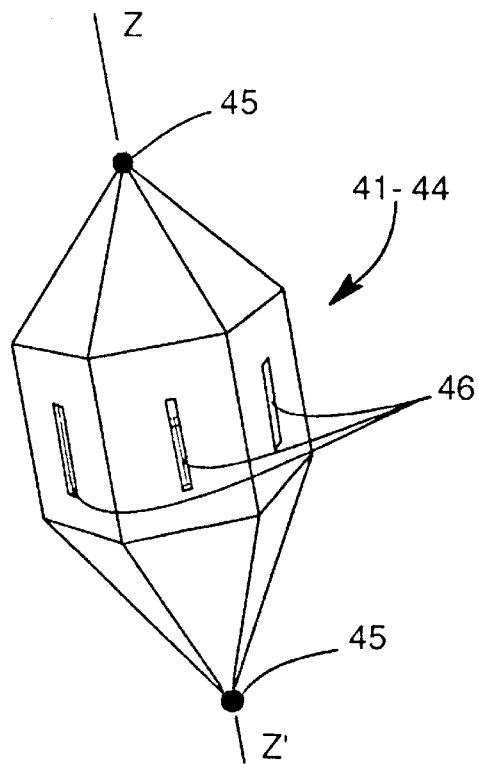
FIGS. 5A and 5B represent schematically and respectively a perspective view of a casing or a single measuring head and a plan view of an arrangement of four casings according to FIG. 5A.
Figure 5:
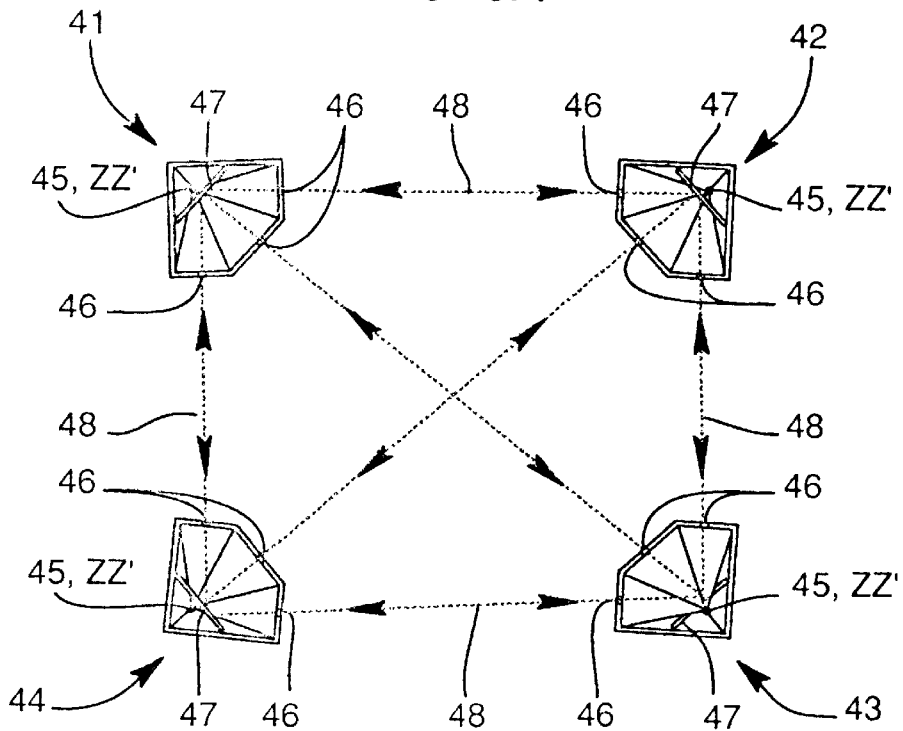

Referring to FIGS. 5A and 5BE, another arrangement according to the invention comprises four casings 41 to 44. Each casing 41 to 44 comprises two luminous emission sources 45, three slots 46 or image definition means and an optical linear detector 47 receiving luminous radiation beams 48.

Each casing 41 to 44 comprises three flat surfaces in each of which is provided a slot 46. The vertical planes perpendicular to these surfaces and passing through the three slots 46 of each casing meets substantially along a vertical axis ZZ' on which are located the two luminous emission sources 45 on opposite sides of the slots 46. The optical linear detector 47, arranged so as to receive the radiations 48 passing through the three corresponding slots, and be disposed slightly in front of the axis ZZ', so as to reduce the probability of intersection and interference of the incident luminous beams 46 in the calibrating position shown in FIG. 5B. Thus, by placing the casings in calibrating position at the corners of a rectangle, the luminous sources 45 are disposed exactly at the corners of this rectangle: this arrangement has the advantage relative to the embodiment of FIGS. 4A and 4B of eliminating the departures of the luminous source which introduce corrections of distances and angles as a function of the distance of separation between the measuring casings.

The two separate luminous emission sources 45 supply two images that are separated or overlie on the linear optical detector 47 of another casing. By taking the mean of the positions of the two images obtained, there is obtained a measurement relative to the mean optical axis which is independent of the respective degrees of verticality of the casings of the sources 45 and of the casing containing the linear optical detector 47. Thus, this embodiment of the invention has the advantage of avoiding corrections of verticality and supplies with no correctional computation the values returned to the medial plane passing through each axis segment ZZ' of each casing connecting the two corresponding luminous sources 45.

Figure 6:
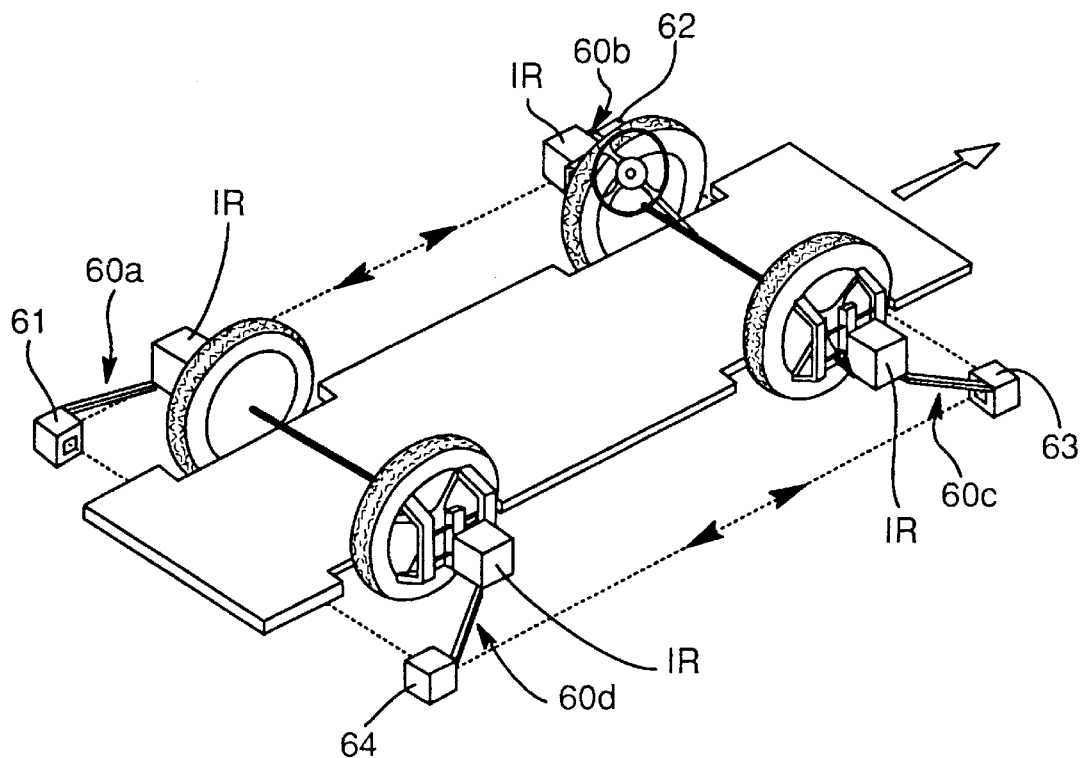
FIGS. 6A and 6B show schematically and respectively a perspective view and a plan view of a mounting of four measuring arms according to the invention, on a vehicle.
Figure 6:
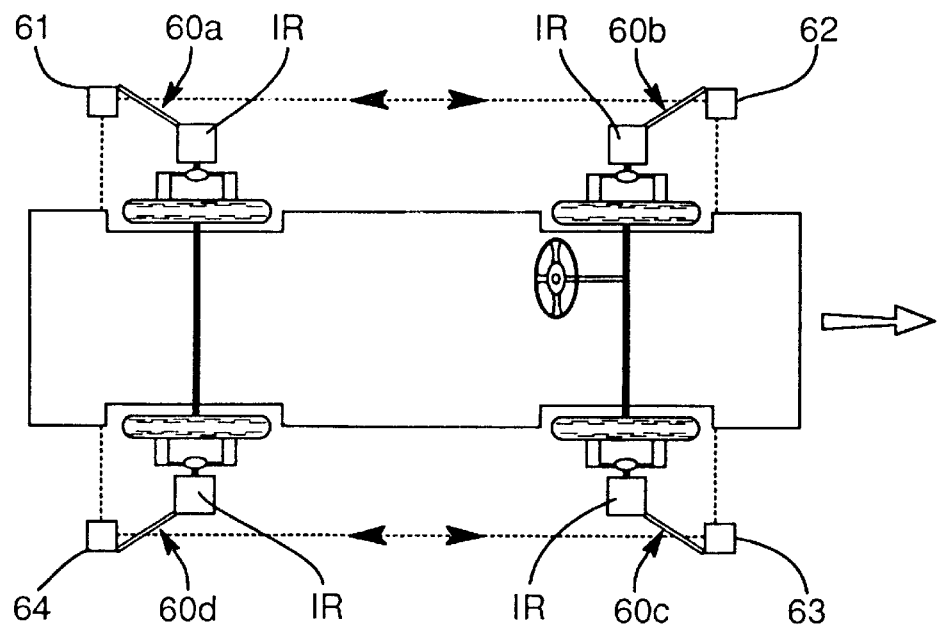

With reference to FIGS. 6A and 6B, a geometric inspection device for wheeled vehicles is shown in position mounted on a vehicle shown without its body.

The device comprises a central control and computation unit (not shown) connected by communication means to measuring arms 60a, 60b, 60c, and 60d. Redundant communication means can comprise two transmission terminals: of course, the invention is applicable to any other arrangement of the communication scheme by wire connection or wireless connection (radio, infrared radiation, sonic transmission).

Each measuring arm 60a to 60d comprises on the one hand a casing IR fixed by a hook on the wheel and containing circuits of an inclinometer I and of a potentiometer R which coact with the casings 61 to 64 disposed at the ends of the arms 60a to 60d, which extend inwardly of the vehicle in front of the front wheels and rearwardly of the rear wheels. Each casing 61 to 64 disposed respectively at the end of a rigid support of a measuring arm 60a to 60d is a casing provided with a multidirectional optical receiver and with a multidirectional luminous emission source or two unidirectional luminous emission sources, of the type disclosed above with reference to FIGS. 1A to 3B.

There is arranged in each casing 61 to 64 the optical receiver, particularly a detector of the CCD type, in a direction making substantially an angle of 45° in the horizontal plane with the longitudinal axis of the vehicle. This preferred arrangement thus permits saving during production of the device four optical detectors (of the CCD type) and the associated electronics. The discrimination of the measurements in the transverse direction and of the measurements in the longitudinal direction is simply carried out, for example, by using a transverse mask comprising slots of a width substantially different from the width of the slots of the longitudinal mask disposed in another surface of the cube corresponding to the shape of a casing 61 to 64. The discrimination of the luminous rays incident on the slot means of different width has been described in particular in French patent application 2.711.238.

The casings 62 and 63 are mounted space transversely and longitudinally of the wheels by a predetermined transverse distance such that the longitudinal light beam from the casing 62 will not be cut by the tire of the left wheel during steering to the right and such that the longitudinal light beam from the casing 63 will not be cut by the tire of the right wheel during steering to the left and similarly, in a manner known per se, according to a longitudinal distance corresponding substantially to the length of the rigid support of a measurement arm sufficient such that the transverse light beam will not be cut by the front or rear tires of the corresponding wheels or will not encounter a member of the spoiler type, shock absorber, etc. Thanks to this modification according to the invention, steering for measuring the chase and pivot angles is effected without difficulty for steering values of 10° or 20°.

According to a less preferred arrangement of the invention, the luminous emission sources of the casings 61 to 64 do not all emit simultaneously, but emit on the contrary sequentially: in this case, it is possible to use identical slot widths for the transverse and longitudinal slots, because the discrimination is timewise and not geometrical. Preferably, in these two cases, the casings 61 to 64 are disposed downwardly relative to the wheel axle such that the casing IR containing one or several inclinometers I and the potentiometer R will not constitute an obstacle to the luminous communications between casings, either in straight ahead driving or in maximum steering to the right or the left. As will be seen hereinafter, the invention also covers the case in which the inclinometers I are contained in the casings 61 to 64.

This modified embodiment is preferred in the case in which the vehicle to be inspected is disposed on or adjacent an auxiliary lifting bridge adapted to interrupt the active luminous beams.

Figure 7A:
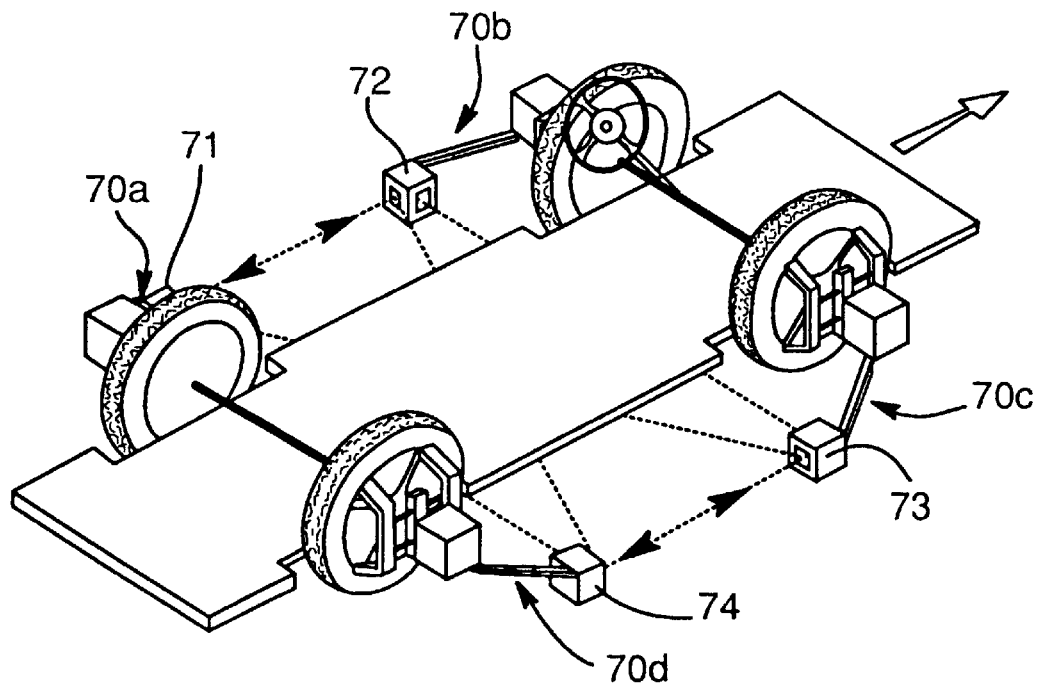
FIGS. 7A and 7B show schematically and respectively a perspective view and a plan view of another mounting of four measuring arms according to the invention, on a vehicle.
Figure 7B:
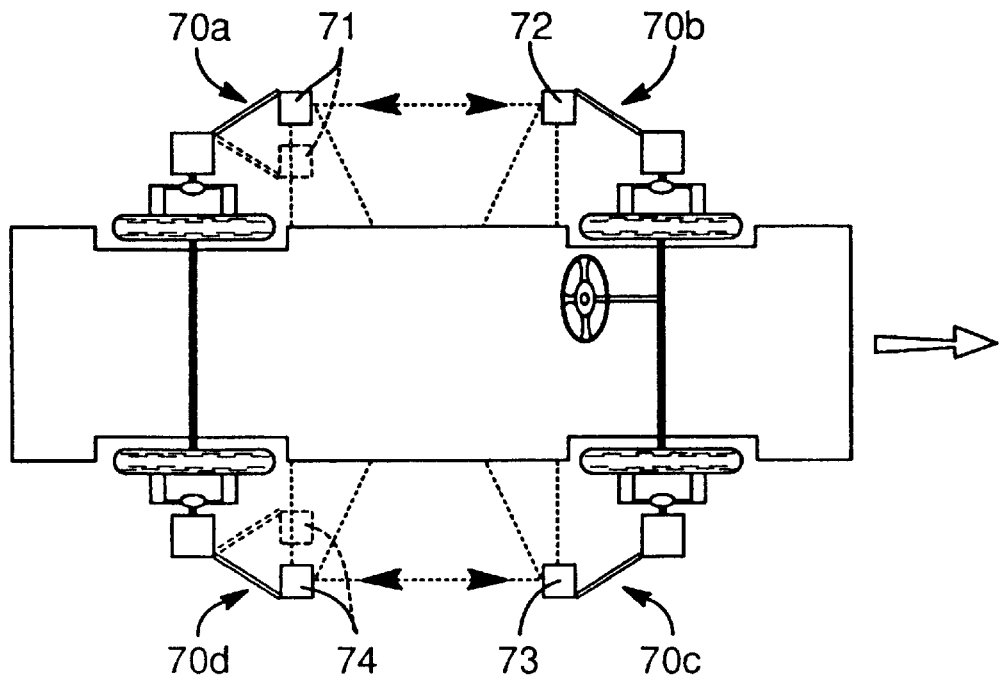

Referring to FIGS. 7A and 7B, another modification of the device according to the invention comprises arms 70a to 70d disposed inwardly of the vehicle, at the end of which are disposed casings 71 to 74 adapted to communicate optically between themselves or to effect geometric measurements not only angularly, but also measurements of distance along at least one diagonal of the quadrilateral defined by the casings 71 to 74 analogous to the casings described with reference to FIGS. 4A to 5B.

The document FR 2.711.238 discloses the general principle of dimensional measurements that can be obtained with the aid of a casing with several slots.

Knowing this principle of physical measurement, one skilled in the art will carry out by simple geometric computations the determination of the distances between the casings and will thus obtain not only the characteristics of parallelism, but also the characteristics of track and wheel base of the vehicle permitting in particular inspecting the dimensional characteristics of the axles or the good securement of the wheels to the axles of the vehicle.

Preferably, the arms 70a to 70d are arranged such that the casings 71 to 74 will be disposed inwardly of the wheels of the vehicle in the longitudinal direction, but externally transversely.

One could if desired as shown in broken lines for the casings 71 and 74 secured to the rear wheels of the vehicle, provide arms 70a to 70d such that the casings will be disposed both inwardly longitudinally and inwardly transversely: this arrangement reduces further the size of the quadrilateral defined by the casings and accordingly increases the precision of measurement, particularly of dimensional measurement.

This arrangement is used for all the casings 71 to 74 when there is a lifting bridge comprising support plates for wheels raised so as to provide a passage for the luminous communication paths between casings below the vehicle or alternatively for the passage of the casings themselves.

To pass from a position of casing 71 or 74 shown in broken lines to a position of casing 71 or 74 shown in full lines, there is provided a removable mounting of the casing 71 or 74 so as to be able to turn by 90° or 180°, so as always to present an active optical reception service during mounting of a device according to the invention with the aid of modular elements comprising substantially cubicle blocks which are disconnectable, connectable, adapted to snap in or mechanically and electrically detachable from a rigid support or from a connection support: one skilled in the art will have no difficulty determining the mechanical mountings permitting presenting the casing so as to provide optical communication with another facing casing.

Thanks to this modular construction of casings that can be mounted on or within the support arm 70, it is possible to construct a large number of quadrangles with the aid of these modules and to pass in particular from a mounting shown in FIGS. 6A to 9B, to any other mounting shown in these figures. Because of the fact that each casing can occupy three different positions, the positions inwardly of the vehicle give rise to ten different quadrilaterals, of which two are substantially adjacent a parallelogram, two substantially adjacent a trapeze and two others substantially adjacent a rectangle, and it will be seen that there exists at least four other quadrangles corresponding to at least one external position of a casing. As a result, there exists at least ten quadrangles adapted to be constructed with the aid of modular casings by simple simultaneous mechanical and electrical snapping in, which permits, on a given vehicle, measuring with very high precision, by correlating the possible errors, the characteristics of the wheels of the vehicle.

Figure 8A:
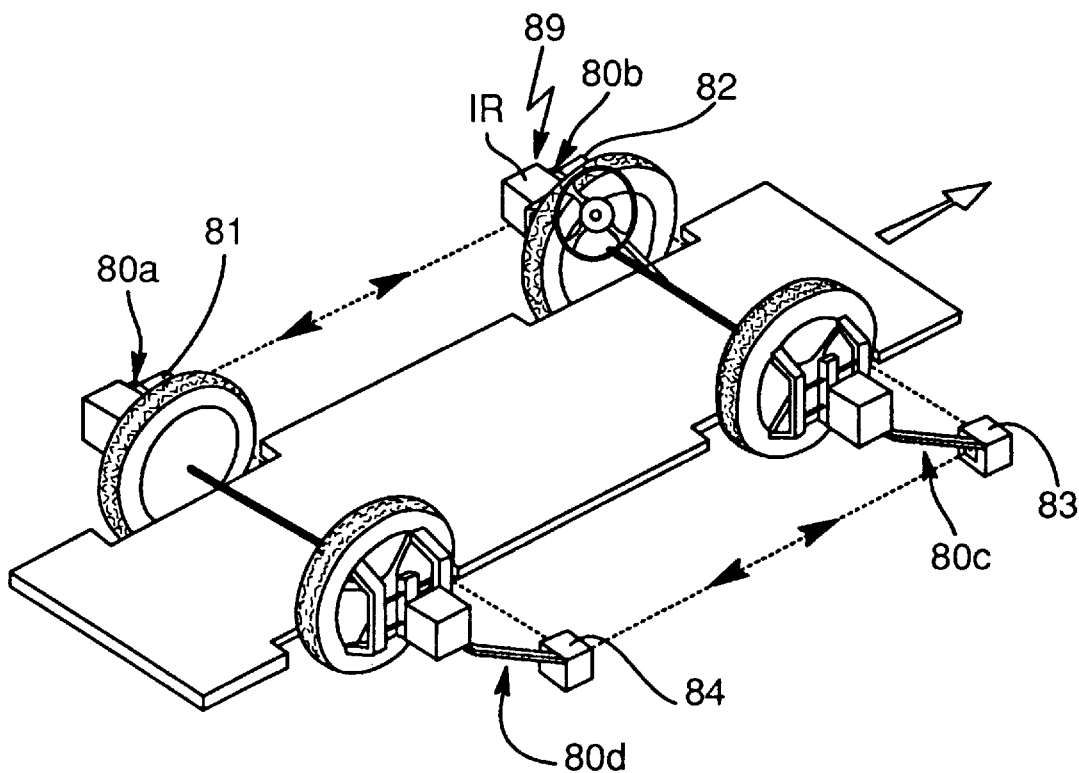
FIGS. 8A and 8B show schematically and respectively a perspective view and a plan view of another mounting of four measuring arms according to the invention, on a vehicle.
Figure 8:
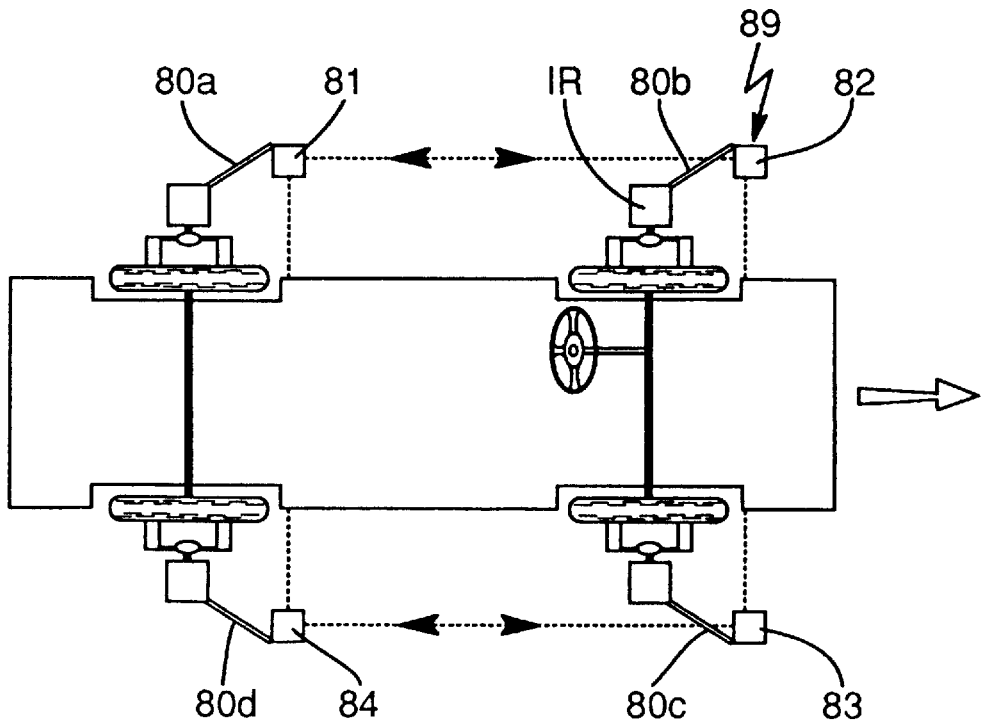

Referring to FIGS. 8A and 8B, another geometric inspection device is shown in position mounted on a vehicle shown without its body.

The device comprises a CPU (not shown) connected by wireless communication means 89 to the front left arm 80b carrying the casing 82. Between the arms 80a to 80d, the communications take place by wireless transmission, preferably of the optical type, according to transmission paths substantially adjacent the effective optical axes of geometrical measurement.

The casings 81 to 84 are disposed in front of the front wheels and in front of the rear wheels such that their longitudinal left or right spacing is substantially equal to the left or right wheel base of the vehicle being inspected. This arrangement thus frees all the space to the rear of the rear wheels for other punctual interventions for inspection of the body work, of the exhaust system, of spot repairs or rapid maintenance operations.

Preferably, the wireless communication means 89 connecting the CPU to the front left arm 80b is a hertzian communication means with an associated transmission protocol, for example of the type of BUS CAN (trademark of the Dutch company PHILIPS) or of the type LON WORK (trademark of the American company ECHELON).

Figure 9A:
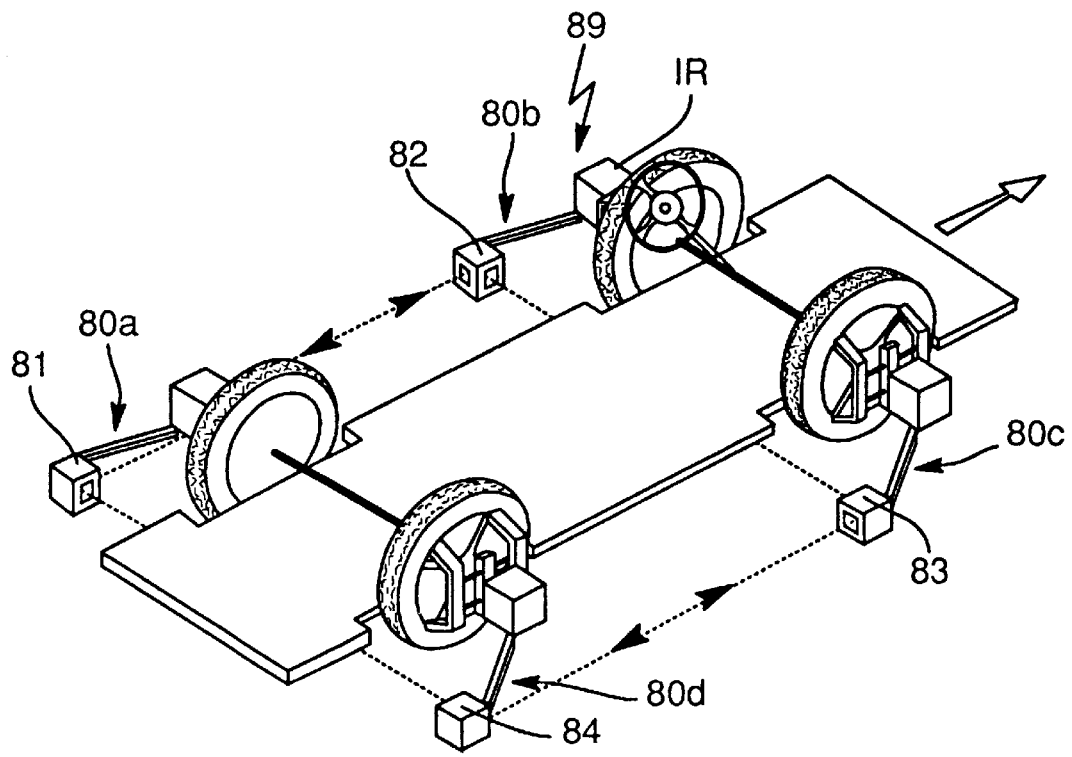
FIGS. 9A and 9B show schematically and respectively a perspective view and a plan view of another mounting of four measuring arms according to the invention, on a vehicle.
Figure 9B:
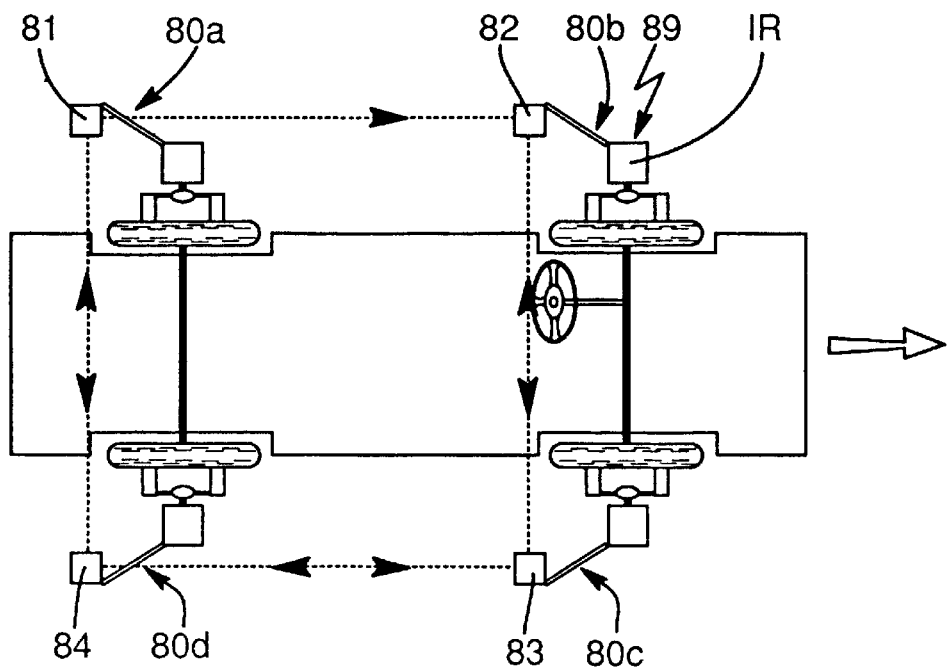

Referring to FIGS. 9A and 9B, another mounting of geometric inspection device is shown in position mounted on a vehicle shown without its body.

The device comprises a CPU (not shown) connected by wire communication means 89 to the front left arm 80b carrying the casing 82. Between the arms 80a to 80d, the communications take place by wireless transmission, preferably of the optical type, according to transmission paths substantially adjacent the effective optical axes of geometric measurement.

The casings 81 to 84 are disposed to the rear of the front wheels and to the rear of the rear wheels such that their longitudinal left or right spacing is substantially equal to the left or right wheel base of the vehicle undergoing inspection. This arrangement thus frees all the space in front of the front wheels for other point interventions of inspection of body work, exhaust, spot repairs or rapid maintenance operations and permits controlling the vehicles provided with front spoilers.

Preferably, the wired communication means 89 connecting the CPU to the front left arm 80b is a cable communication means with an associated transmission protocol for example of the BUS CAN type (trademark of the Dutch company PHILLIPS) or of the LON WORK type (trademark of the American company ECHELON).

According to a first control mode applicable to all the devices according to the present application, the devices comprise remote control means and information transfer means from a data bank: these remote control means permitting leaving the centra unit in active position, even in the absence of a vehicle, which permits a client desiring to make an appointment, to telephone directly the central unit while supplying by means of a personalized code the client and vehicle references, such that, upon arrival of the client in his vehicle, the device can automatically start the balance or adjustment operations with no loss of time required by the taking of information or identification of the vehicle; similarly, in case of doubt, the telecharge permits remote gathering of information from a data bank of an automobile manufacturer to learn the characteristic defects of a given type of vehicle; finally, the device can comprise a subprogram of accounting for working time permitting remote starting at a predetermined time and stopping of the work at a predetermined time, such that the use of the device is entirely remotely controlled thereby avoiding any risk of fraudulent use.

According to a second control mode applicable to the invention, the devices comprise telediagnostic or telemaintenance means, for taking information as to the condition of the device by technical means of telecommunication (telephone, telecopier, telex, teletext, vocal interrogation and control) or for supplying instructions for repair or adjustment so as to take care of a particular defect referenced by the data bank of the builder of the device: these telediagnostic or telemaintenance means can also comprise telematic means or mass interactive memories of the CD-ROM or CDI (compact disc-interactive) type.

Figure 10A:
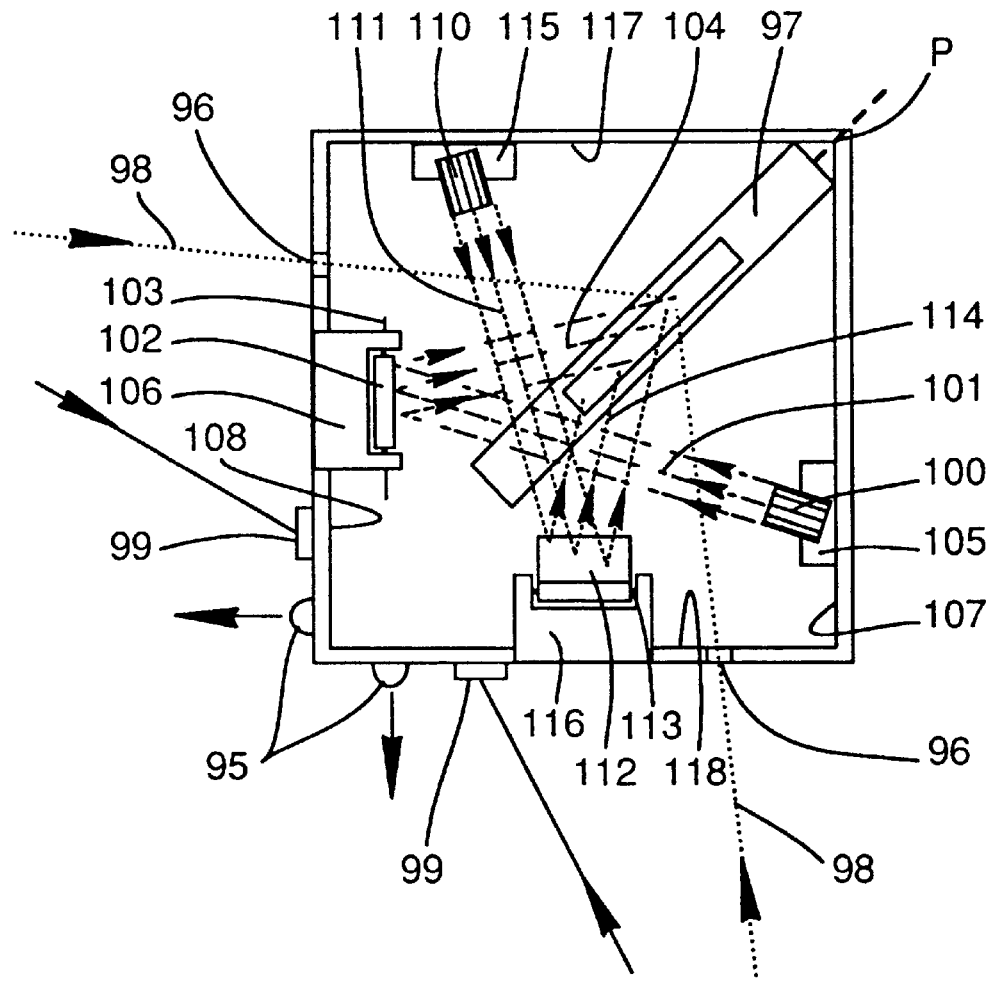
FIG. 10 shows schematically a plan view of an example of measuring device according to the invention.
Figure 10B:
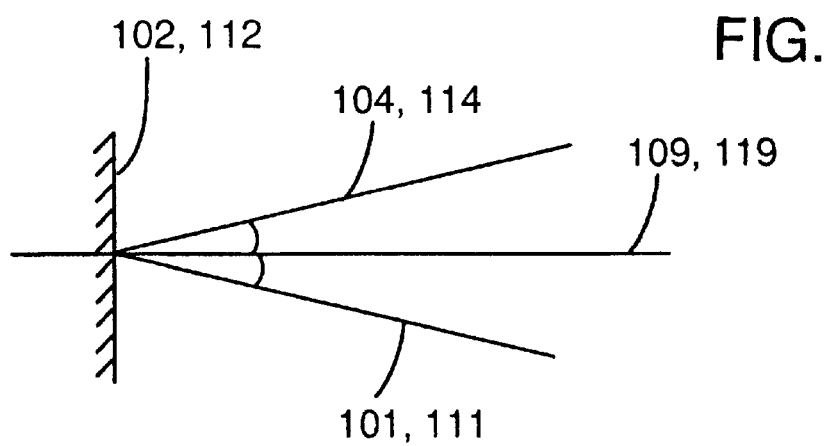

Referring to FIG. 10, a preferred embodiment of measuring and geometric inspection casing has a substantially cubicle shape with two luminous emission sources 95; two slots or image definition means 96 and a single linear optical detector 97 on which are formed images produced by substantially horizontal incident luminous radiations 98.

Two photoluminous cells 99 fulfill both the wireless transmission function by infrared radiation of data and information on control and condition, and the function of triggering the synchronization of the measurement effected by the optical linear detector 97 with the emission of an incident ray 98. Thus, opening the window of reading by a measured angle adapted to serve for the computation of parallelism, is automatically triggered by the detection of the luminous measurement signal 98 incident on a photo cell 99, whilst the closing of the reading window is effected after acquisition, the lapse of a predetermined time interval or stopping of the emission of the corresponding measurement signal 98.

Each luminous emission source 95 is preferably an emission source which can be controlled or modulated so as to emit measurement signals serving for the measurement itself and signals of communication of luminous intensity lower than the intensity of the measurement signals according to a predetermined communication protocol: a corresponding source 95 is for example an electroluminous diode emitting in the infrared range.

Preferably, the linear optical detector 97 is a detector of the CCD type (charge coupled device) or PSD type (position sensitive detector) provided with an electronic gate, so as to decrease the opening time. Thus, for a given measurement signal, the detector 97 has an opening window of reduced time width: this arrangement permits decreasing the duration of the illuminations or pulsed emissions for measuring the sources 95 and to reduce the instantaneous power consumption of the measurement.

In this preferred modification of measurement casing, a single linear optical detector 97 serves not only for the measurement of angles in the horizontal plane to determine the values of parallelism, but also for the measurement of physical parameters to determine the vertical inclinations, the body work, the camber and pivot of each wheel of the vehicle to be inspected.

To this end, there are used measurement radiations incident on the linear optical detector 97 which are oriented in a substantially horizontal direction or which make a small angle with a substantially horizontal direction, so as to orient the linear optical detector 97 in a direction adjacent the vertical located within the plane of symmetry P of the casing to increase the precision of measurement. Preferably, the direction of orientation of the detector 97 forms with the vertical an angle comprised between 15 and 16 degrees of arc.

A first physical parameter is obtained by the measurement of the vertical offset between a zero position corresponding to a horizontal position and a measured position corresponding to a vertical inclination. To this end, the measurement casing contains a first luminous source 100 adapted to produce a flat beam 101 in an emission direction fixed relative to the surface of the casing bearing the source 100, a first flat mirror 102 mounted in a pendulous manner about an axle 103 mounted fixedly relative to the casing so as to reflect the flat luminous beam 101 as a flat reflected beam 104 of predetermined width which illuminates the optical detector 97 producing a curve of luminous intensity depending on the spatial orientation of the surface of the casing bearing the luminous source 100. The supports 105, of the luminous source 100, and 106, of the dependent axle 103, are preferably secured to the two opposite walls 107, 108 of the casing which are substantially parallel to each other. By computation, there is finally determined the inclination of the casing relative to a horizontal reference plane 109 which is the plane bisecting the dihedral formed by the flat beams 101 and 104, described above, and there is then derived the vertical inclination of the casing parallel to a first predetermined planar direction.

A second physical parameter is obtained by the measurement of the offset between another zero position corresponding to another horizontal position and a measured position corresponding to a vertical inclination. To this end, the measuring casing contains a second luminous source 110 adapted to produce a flat beam 111 in a fixed emission direction relative to the surface of the casing bearing the source 110, a first flat mirror 112 mounted pendulously about an axle 113 mounted fixedly relative to the casing so as to reflect the flat luminous beam 111 as a flat reflected beam 114 of predetermined width which illuminates the optical detector 97 producing a curve of luminous intensity depending on the spatial orientation of the surface of the casing bearing the luminous source 110. The supports 115, of the luminous source 110 and 116, of the dependent axle 113 are preferably secured to the two opposite walls 117, 118 of the casing that are substantially parallel to each other. By computation, there is finally determined the inclination of the casing relative to a horizontal reference plane 119 which is the plane bisecting the dihedral formed by the flat beams 111 and 114 mentioned above, and there is then derived the vertical inclination of the casing parallel to a second predetermined planar direction.

Those skilled in the art know, from the knowledge of two vertical inclinations relative to two vertical predetermined secant planes, how to calculate the body angles, track, pivot, included angles and other angles used for the measurement and inspection of the geometry of vehicles.

The invention thus permits with a single optical detector 97, measuring the physical parameters necessary for the establishment of all the characteristics of the geometry of the vehicle whilst using exclusively substantially horizontal radiations. This arrangement gives rise to a great economy of production because of the decrease in the number of optical detectors 97 whose use is necessary, and also facilitates the calibration of the device which can be effected simultaneously for all the angles, and not in several separate steps contrary to the calibration processes of the prior art.

Figure 11A:
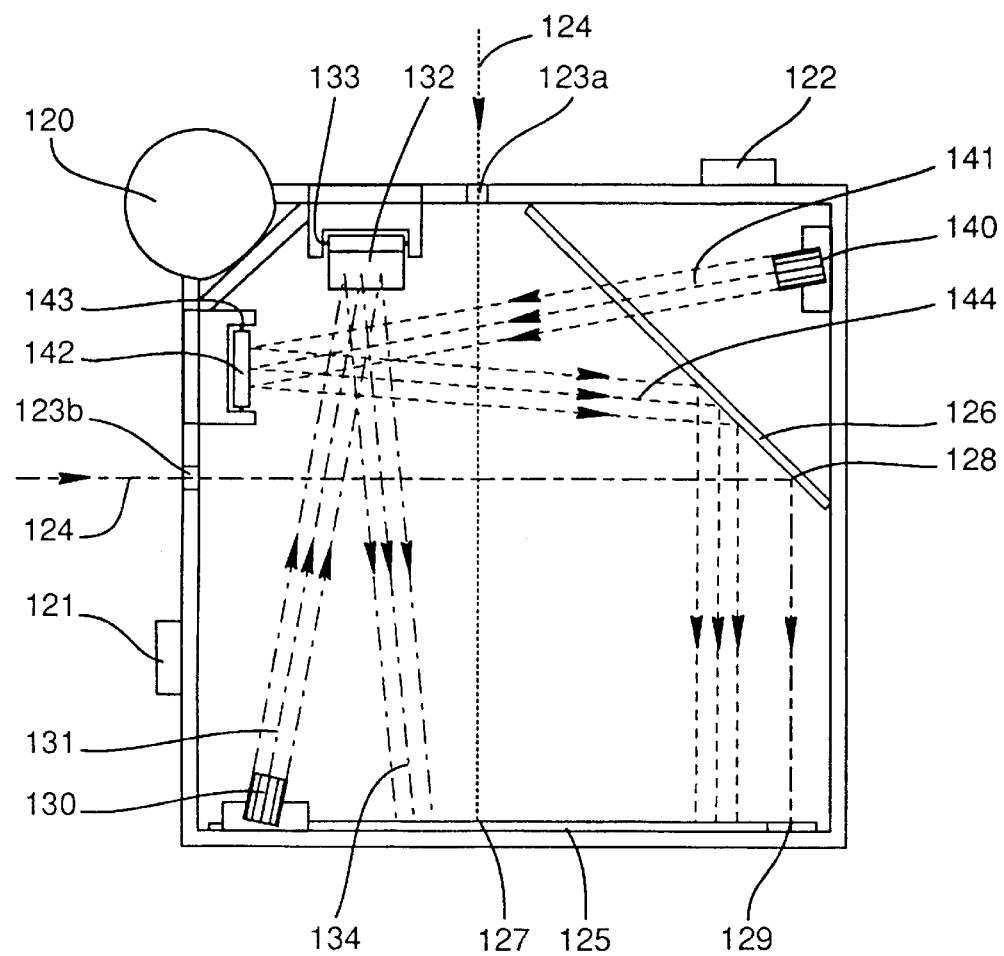
FIGS. 11A and 11B show schematically and respectively a plan view and a perspective view of another casing or measuring head for a device according to the invention.
Figure 11B:
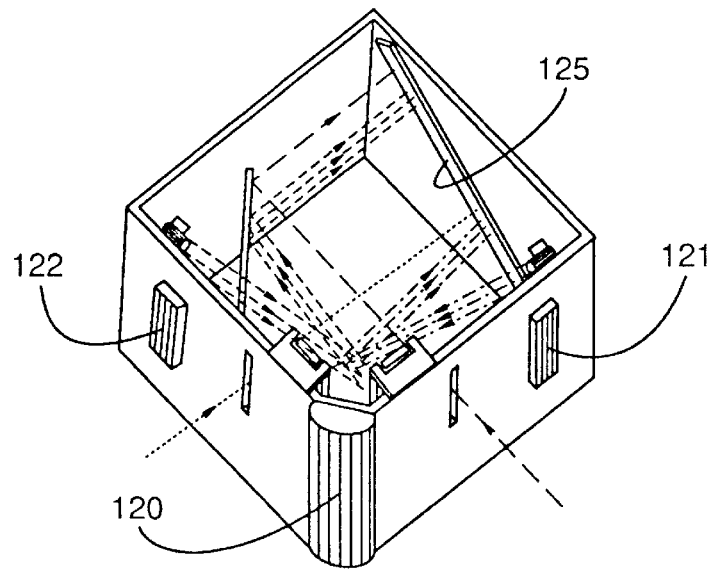

With reference to FIGS. 11A and 11B, another modification of measuring casings according to the invention comprises at least one luminous source 120, detecting photocells 121 and 122 sensitive to luminous radiation from another casing, slots 123 or image definition means suitable to form an image of horizontal radiation 124 on an optical linear detector 125. The image formed by one of the rays 124 arrives directly at 127 on the detector 125 through a slot 123, whilst the image formed at 129 by another slot 123 is obtained after reflection at 128 from a flat mirror 126 which reflects this image onto the flat detector 125. Preferably, the direct image without reflection on the flat mirror 126 is an image of measurement in the longitudinal direction of the vehicle, whilst the image obtained after reflection from the flat mirror 126 is a measurement image in the transverse direction.

The casing also contains a first luminous source 130 emitting a substantially horizontal beam 131 which strikes a depending mirror 132 suspended from an axle 133 to reflect the flat beam 131 to a second flat beam 134 which strikes the optical linear detector 125. The same is true for the second luminous source 140 emitting a flat beam 141 reflected by a mirror 142 suspended from an axle 143 to reflect the flat light beam 141 as a flat beam 144 so as to form an image on the linear detector 125. The difference consists in the supplemental reflection by the flat mirror 126 before illuminating the linear optical detector 125.

An advantage of this embodiment consists in the possibility of being able to secure the optical linear detector 125 onto one surface of the cubicle shape of the casing whilst permitting thus a large reduction of the size of the casing and ease of manufacture permitted by construction of the reference surface bearing the optical linear detector 125. Moreover, the images formed in the usual configuration of a vehicle are all located at positions spaced from each other on the optical linear detector 125, such that there will be no measurement signal confusion. This physical arrangement thus ensures an automatic discrimination of the signals and facilitates writing a control and computation program of the device for geometric measurement and inspection of vehicles.

Another important advantage is that all the incident beams are substantially perpendicular to the optical linear detector, which avoids any parasitic reflection and any undesirable loss of luminous intensity.

With respect to the mounting on a vehicle described above, the casings described with reference to FIGS. 10 to 11B are disposed at the end of arms in one of the configurations described. Given that the casing placed at the end of the arm contains all the physical measurement members, it is possible to locate the control and signal processing electronics within the casings IR disposed on the axes of rotation of the vehicle wheels or directly within the casings or measurement heads.

Given the compactness of the arrangement of the embodiment of FIGS. 11A and 11B, the volume of the casing can be inscribed within a cube less than 10 cm on a side, which gives rise to saving of materials and lightening the loads placed at the end of the arms.

With reference to FIGS. 12A through 12C, another embodiment of casing according to the invention uses a pair of pendants disposed on two pendulous axles of pivoting perpendicular to each other.

In this arrangement, the linear optical detector 150 is disposed substantially horizontally parallel to a diagonal plane of the cubicle configuration of the casing. Two light sources 151 and 152 each emit a luminous radiation which is diaphragmed respectively by a slot 153 or 154 provided in a mask 155 or 156 opaque to the luminous radiation and mounted on each respective depending axle 157 or 158.

The luminous radiations emitted by each luminous source 151 or 152 are diaphragmed to form flat beams by the slots 153 and 154 oriented vertically because of their dependent suspension at 159 and 160, respectively.

The flat beams diaphragmed by the vertical slots 153 and 154 illuminate the optical linear detector 150 at positions 161 and 162, with respective images of the sources 151 and 152 via the optical system in question.

To avoid oscillations and untimely flutter, it is preferred to mount the pendants bearing the slots 153 and 154 with a shock absorbing system providing stable vertical positions. To this end, there is provided within the casing two copper plates 163 and 164 located below the pendants bearing the slots 153 and 154 and to use the principle known as braking by FOUCAULT currents.

Braking by FOUCAULT currents is preferably carried out by using two magnets 165 and 166 (respectively 167 and 168) connected to the lower end of each pendant. It is known that the balance of the pendant gives rise to currents induced in the copper plate, which, by the auto-induction effect, tend to immobilize the permanent magnets 165 and 166 in a stable position of equilibrium.

This preferable arrangement can also be transposed if necessary to stable braking in the vertical position of a flat mirror suspended on a pendant axle described above with reference to FIGS. 10 through 11B.

Although the casing described with reference to FIGS. 12A through 12C is not shown with image defining slots producing elementary angles for computation of parallelism, it will be understood that the invention also covers the modification in which the measurement casing of FIGS. 12A through 12C is completed by external sources of luminous emission and slots for the formation of an image on the optical linear detector 150.

In this embodiment, the pendant suspension axles are perpendicular to each other which facilitates the establishment of the computation and signal processing program resulting from the beams emitted directly from the sources 151 and 152 through the vertical diaphragms 153 and 154 onto the linear detector 150.

Figure 13A:
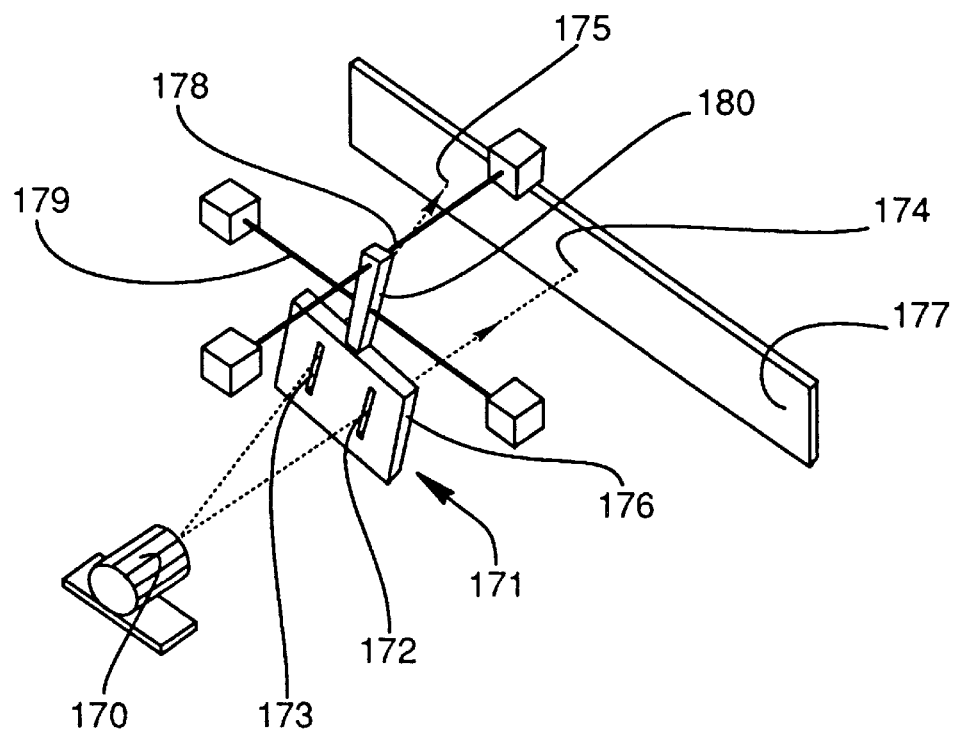
FIGS. 13A and 13B show schematically and respectively in perspective and in plan view a measuring arrangement according to the invention.
Figure 13B:
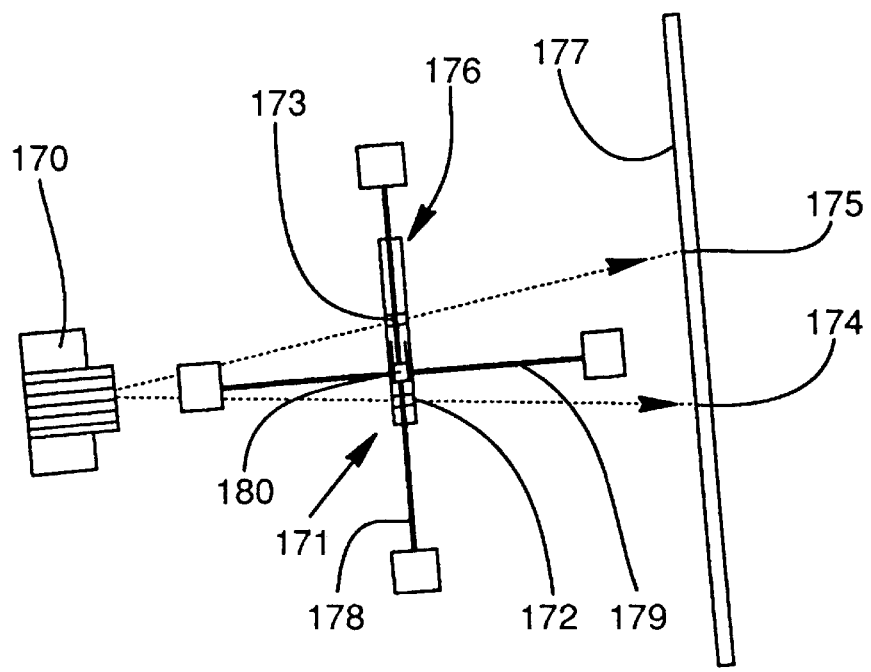

Referring to FIGS. 13A and 13B, a pendant diaphragm with two slots is shown on a Cardan mounting.

A luminous source 170 emits a luminous radiation diaphragmed by the system 171 comprising two slots 172 and 173 so as to form two separated images at 174 and 175 on an optical linear detector 177. The two diaphragmed slots 172 and 173 are provided in a mask 176 opaque to luminous radiation and suspended by an axle on a Cardan mounting schematically provided by the double suspension about a first axle 178 and about a second perpendicular axle 179 of the shaft of pendant 180.

Because of the freedom of orientation of the diaphragmed system 171, the orientation of the slots 172 and 173 is absolutely vertical and permits the determination of the assembly of the data necessary in the following manner:

The distance between the barycenters of the luminous masks 174 and 175 gives a first physical parameter indicating whether the pendant 171 is near or far from the source 170 of luminous emission and the position of the barycenter of one or the other of the luminous masks 174 and 175 gives an indication relative to a reference position of the inclination of the apparatus.

Thanks to these two coordinates, one skilled in the art derives by inverse computation the vertical inclinations relative to two sought perpendicular planes. From these vertical inclinations, it is known to be able to compute the usual parameters for geometric measurement and inspection of the vehicle by simple change of coordinates and the use of formulae known to specialists.

Of course, the invention also applies to the case in which the arrangements described with reference to FIGS. 13a and 13B are combined with those described with reference to the casing of FIGS. 1A through 9B to produce measurement casings and complete devices.

Figure 14A:
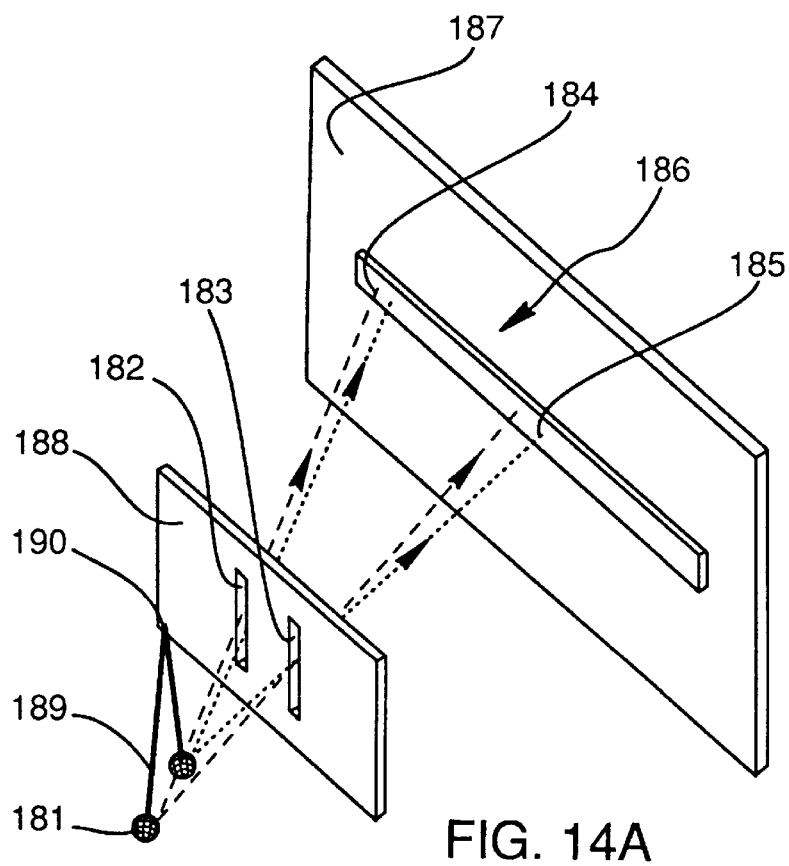
FIGS. 14A and 14B show schematically and respectively in perspective and in plan view another measuring arrangement according to the invention.
Figure 14B:
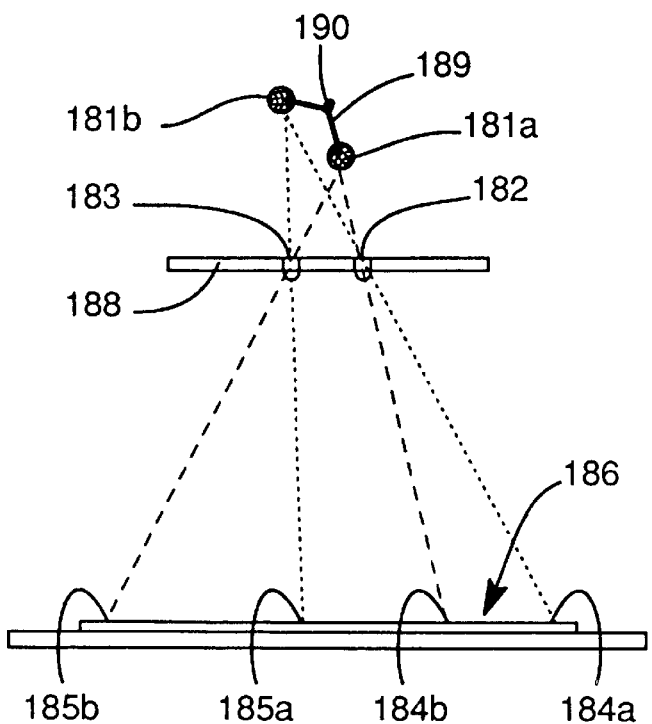

With reference to FIGS. 14A and 14B, another modified embodiment of double vertical inclinometer according to the invention comprises a light source 181 emitting luminous radiation diaphragmed by two slots 182 and 183 to form two luminous masks 184 and 185 on an optical linear detector 186 disposed on one surface of a casing 187. In this example, the opaque plate 188 bearing the two diaphragmed slots 182 and 183 is fixed relative to the casing and the light source 181 is suspended as a pendant with a conductive wire 189 secured at 190 to a fixed point on the casing. Thus, when the light source 181 displaces from a first position 181a to a second position 181b, the corresponding masks 184a and 185a will displace to 184b and 185b.

In a manner analogous to that explained with reference to FIGS. 13A and 13B, one skilled in the art will determine without difficulty the vertical inclinations relative to the two vertical planes of the measurement casing containing the elements described above. This arrangement is advantageous in that it permits the securement of the optical linear detector 186 parallel to a surface of a linear casing having a cubicle configuration and is compatible with casings comprising slots described above with reference to FIGS. 1A through 10.

With reference to FIGS. 15A and 15B, another modified optical vertical double inclinometer according to the invention comprises a light source 200 suspended as a pendant with a conductive wire 200a connected to a fixed point 200b on the measuring casing. The light source 200 emits diaphragmed radiation 203 through two slots of an enclosure 209 opaque to luminous radiation emitted by the source 200. The masks formed at 204 on two optical linear detectors 205 fixed on two perpendicular surfaces of the measurement casing having a cubicle configuration supply directly by inverse computation the coordinates in the horizontal plane of the light source 200. The inverse computation of the vertical inclinations with the aid of this information is not difficult for one skilled in the art. Thus, according to the invention, the use of two horizontal radiations forming images on linear optical detectors 205 also oriented horizontally, permits determining without difficulty the vertical inclinations of a measurement casing.

The preceding description, referring to FIGS. 15A and 15B, is also applicable to FIGS. 15C, 15D and 15E in which identical references designate elements identical to those of FIGS. 15A and 15B. The only difference consists in the presence of a cruciform image definition means, of the cruciform slot type analogous to that disclosed with reference 26 in FIGS. 3A and 3B. The linear optical detector 205 is a single linear optical detector disposed in a diagonal plane of the cubicle configuration of the casing. This embodiment permits using an arrangement corresponding to the mounting described above with reference to FIGS. 21 and 22.

The invention is also applicable to the case in which in this embodiment, the luminous source is fixed and the enclosure comprising the two diaphragmed slots is suspended as a pendant such that the two slots performing the function of the diaphragm will be oriented vertically.

With reference to FIGS. 16A and 16B, an inclinometer with horizontal radiation for the measurement of a vertical inclination angle comprises a source of luminous emission emitting radiation in the form of flat pencils that strike an optical linear detector disposed substantially horizontally.

The luminous source 200 is supported on a pendant pivoting axis 201 and moves in the direction of arrow 202 when the angle of inclination relative to the vertical varies. The flat beam 203 oriented substantially vertical is emitted by the source 200 and strikes the optical linear detector 205 at 204. When the light source with a flat pencil 200 displaces in the direction of arrow 202, the displacement of the flat pencil and of the corresponding luminous mask 204 gives an indication of the variation of vertical inclination when solving the following equation: $d = 1 \tan \alpha$, in which d is the displacement of the mask 204, 1 is the length of the pendant or the radius of pivoting of the source 200 and $\alpha$ is the variation of vertical inclination.

FIGS. 17A and 17B show a modified embodiment in which the source 200 suspended from the pendant pivotal axle 201 and adapted to move in the direction of the arrow emits a flat pencil 206 which is no longer perpendicular to the direction of movement 202 but co-linear with this latter. The mask 205 formed on the linear optical detector 204 inclined at an angle relative to the vertical moves while changing altitude, which also gives an indication of the variation of inclination relative to the vertical by means of the same formula as the preceding one.

In the modification shown in FIGS. 18A and 18B, only the orientation of the linear optical detector 205 has changed: the linear optical detector 205 is positioned vertically and thus supplies directly a measurement of the variation of altitude.

Figure 19:
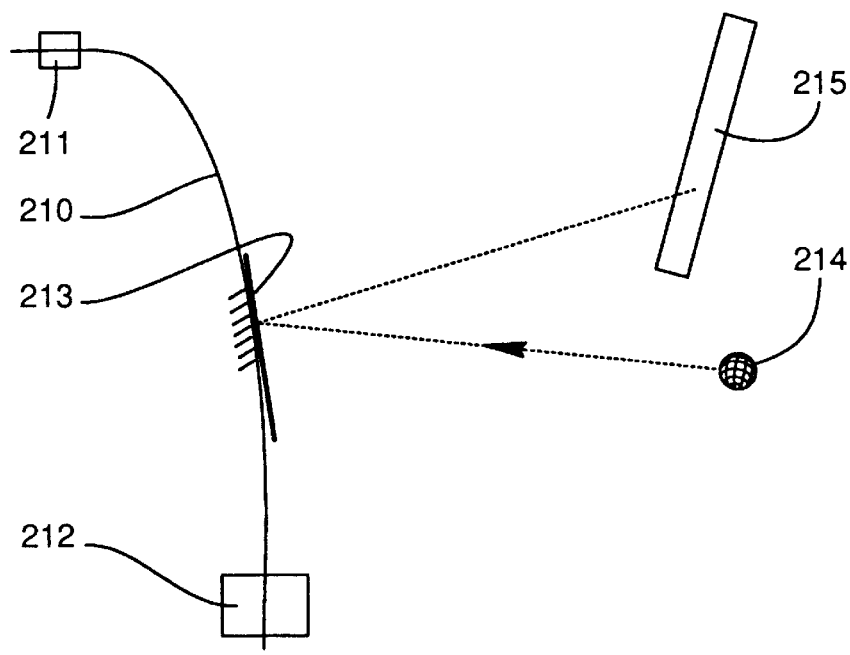
FIG. 19 shows schematically an example of reflecting mounting for the determination of vertical angles according to the invention.

With reference to FIG. 19, a preferred embodiment equivalent to a pendant suspension of an inclinometer for the measurement of the vertical inclination by using substantially luminous horizontal radiation, comprises a resilient flexible blade 210 secured at a fixed point 211 subjected at its free end to the force resulting from a counterweight 212, takes a shape imposed naturally by these elastic characteristics. As a result of the inclination of the casing to which is secured the securement point 211, the resilient blade 210 will be more or less curved, such that the inclination of a flat mirror 213 glued on the flexible resilient blade 210 will vary in a manner determinable by computation as a function of the vertical inclination of the casing. The same flat mirror 213 has for its function to reflect a luminous beam emitted by a source 214 onto an optical linear detector 215.

This preferred arrangement is applicable to all the pendants pivotal suspensions provided in the preceding passages of the specification. The flexible resilient blade 210 is preferably a thin metallic and flexible blade having a thickness comprised between one one-hundredth and five one-hundredth of a millimeter and a width greater than 5 mm sufficient to avoid lateral torsion.

The characteristic of the inclination of the mirror 213 is determined by computation and verified by calibration during production at the factory.

The linear optical detector 215 shown schematically can be disposed in any one of the arrangements provided in the preceding figures, particularly in FIGS. 17A through 18B, in a position adjacent the vertical.

Preferably, to avoid deformation of the end at the free end of the resilient strip 210, the mass 212 is provided in the form of two half-masses fixed to each other on opposite sides of the flexible strip 210. The mirror 213 can be constituted by local polishing of the flexible strip 210 in the case of a stainless metallic blade.

Figure 20A:
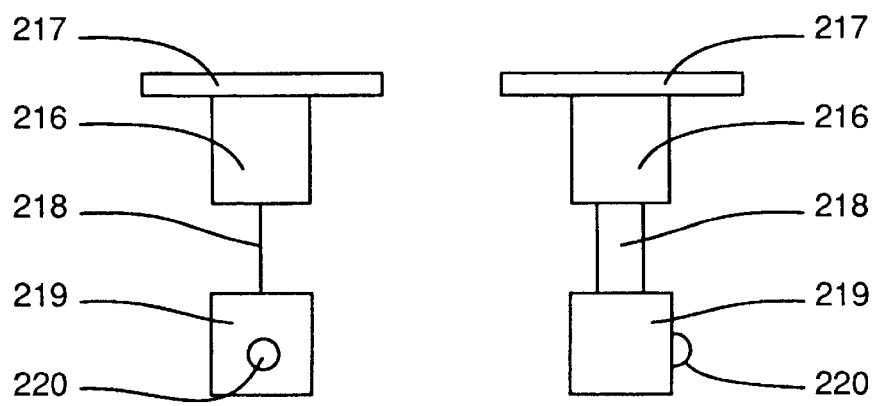
FIGS. 20A and 20B show schematically another example of determination of vertical angles according to the invention.
Figure 20B:
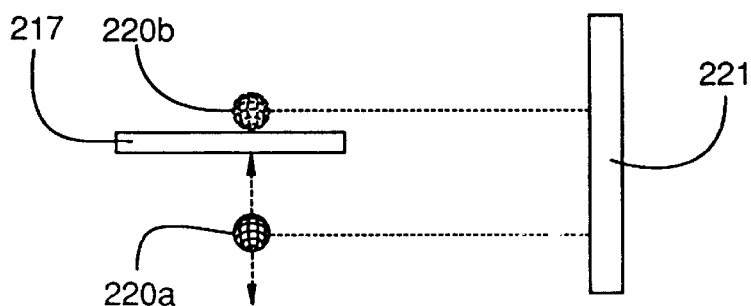

With reference to FIGS. 20A and 20B, another embodiment of pendant suspension is particularly preferred in the case of the suspension of the light source, particularly according to one of the arrangements described with reference to FIGS. 16A and 16B.

A bar 216 secured to the casing 217 bears at its lower end a flexible strip 218 which supports a counterweight 219 containing a light source 220 supplied preferably by the flexible strip 218.

To this end, there is preferably used as flexible strip a flexible circuit of the keyboard tongue type comprising serigraphed tracks of copper or impressions in conductive ink of noble metals (silver) on a strip of synthetic material, for example of the MYLAR type (trademark of the American company DUPONT DE NEMOURS).

This manner of suspension thus has the advantage of high flexibility and direct electrical supply without introduction of parasitic couples due to electrical supply wires.

The light source 220 is preferably a source of the electroluminescent diode type or the like with a focussed emitted beam, so as to produce substantially horizontal radiation producing on an optical linear detector 221 oriented at least partially horizontally, a luminous mask whose displacement permits determining the angle of vertical inclination relative to a predetermined vertical plane.

Preferably, the securements are made by pinching the flexible blade 218 ensuring both a suspension function and an electrical supply function: the mounting by pinching avoids the introduction of parasitic couples and produces no substantial deviation or torsion in the flexible ribbon 218.

Figure 21:
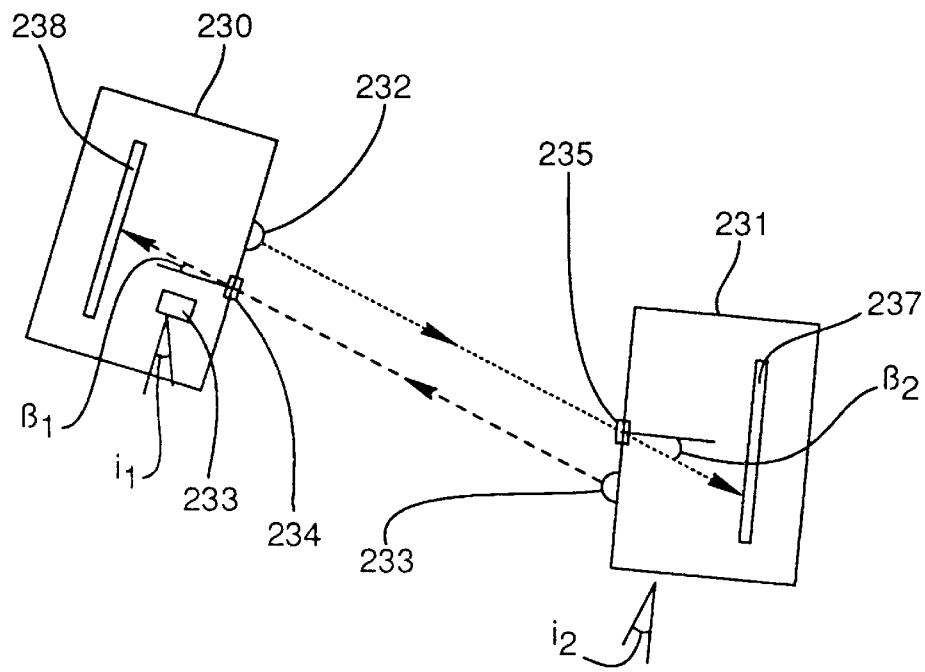
FIG. 21 shows schematically in vertical cross section a principle of determination of vertical angles.

In FIG. 21, the vertical inclination $i_2$ of a casing 231 is determined by using a casing 230 containing an inclinometer permitting determining two vertical inclinations with the help of the following formula: $i_2=i_1+\beta_1-\beta_2$, wherein $i_1$ is the inclination of the casing 230 measured with an inclinometer 239, and $\beta_1$ and $\beta_2$ are the vertical correction angles formed by substantially horizontal slots 234 and 235 or analogous image definition means on the optical linear detectors 237 and 238.

Figure 22:
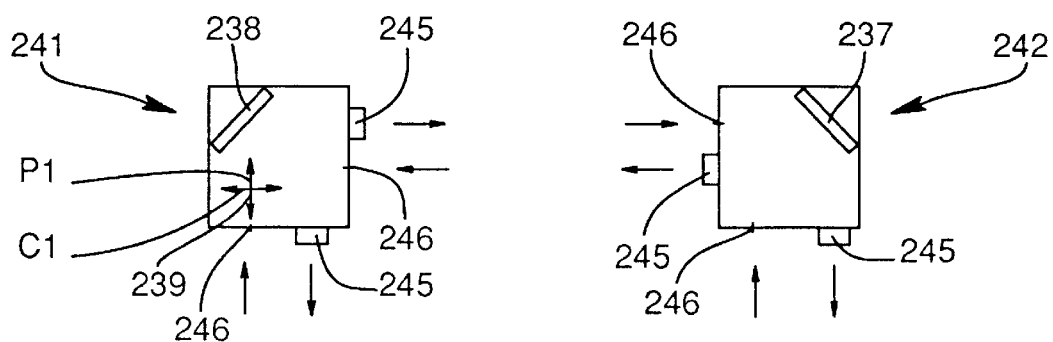
FIG. 22 shows schematically in plan view a preferred arrangement of four casings according to the invention.

As is seen in FIG. 22, it thus suffices to have two casings 241 and 243 with double inclinometers and horizontal slots and to have two casings 242 and 244 with only horizontal slots to obtain all the characteristic angles of the vehicle.

The four casings 241 through 244 are disposed in a manner analogous to those described with reference to FIGS. 1A through 9B and each comprise cruciform slots 246 and sources 245.

The casings 241 and 243 have for example double axis inclinometers. The casings 242 and 244 have no inclinometers. The camber of the casing 242 is calculated with the camber value $C_1$ obtained by 241 and corrected with the aid of measurements between the casings 241 and 242 as explained in reference to FIG. 21.

The pivot angle of casing 242 is computed with the pivot value $P_3$ obtained by 243 and corrected with the aid of measurements between the casings 242 and 243 as explained with reference to FIG. 21.

The same is true for casing 244, the camber of casing 244 is computed with the value of camber $C_3$ of 243 and the measurements between the casings 243 and 244 as explained with reference to FIG. 21.

The pivot angle of the casing 244 is computed with the pivot angle $P_1$ of the casing 241 between the casings 241 and 244 as explained with reference to FIG. 21.

This preferred embodiment, using a total of two double axis inclinometers and four optical linear detectors, is advantageous and economical to make.

The invention described with reference to particular embodiments is in no way limited but covers on the contrary any modification of shape and any variation of embodiment of the invention in which the physical parameters determined from the measurement and inspection of the geometry of vehicles are obtained with the aid of linear optical detectors used for at least two simultaneous or sequential horizontal radiations.

We claim:

1. An apparatus for geometric measurement and inspection of wheeled vehicles, comprising:

plural measuring heads adapted to be fixed to wheels of the vehicle being inspected, for determining the physical parameters representative of an individual geometric position of a first wheel relative to a vertical plane or relative to a horizontal plane, and physical parameters representative of relative geometric positions of the first wheel relative to a second wheel of the vehicle being inspected;

a first source of luminous emission fixed to the first wheel and adapted for emitting at least one first substantially horizontal light ray;

a second source of luminous emission fixed to the second wheel and adapted for emitting at least one second substantially horizontal light ray; and at least one means for forming images of said first and second sources of luminous emission on a first optical linear detector fixed to a third wheel of the vehicle being inspected, said first optical linear detector being adapted for receiving the at least one first and second substantially horizontal light rays from said first and second sources of luminous emission respectively.

2. The apparatus of claim 1, wherein a said first optical linear detector is located within a casing and is sensitive to the at least one first and second substantially horizontal light rays produced by said first and second sources of luminous emission outside said casing.

3. The apparatus of claim 2, wherein said plural measuring heads comprise four measuring casings disposed in a quadrilateral configuration.

4. The apparatus of claim 2, wherein said plural measuring heads comprise four measuring casings arranged in a crossing configuration.

5. The apparatus of claim 2, further comprising another of said means for forming images fixed on a second optical linear detector fixed to a fourth wheel of the vehicle being inspected, said second optical linear detector being adapted for receiving substantially horizontal light rays from said first source of luminous emission, wherein said plural measuring heads comprise four measuring casings arranged to measure physical parameters along two diagonals of a quadrilateral formed by said four casings.

6. The apparatus of claim 1, wherein each of said means for formation of an image of a source of luminous emission is arranged to measure the relative altitudes of the casings relative to each other.

7. The apparatus of claim 6, wherein each of said means for image formation of a source of luminous emission comprise a cruciform slot means.

8. The apparatus of claim 2, wherein said measuring heads comprise casings located at the ends of arms extending outwardly of the vehicle.

9. The apparatus of claim 2, wherein said measuring heads comprise casings located at the ends of arms extending inwardly of the vehicle.

10. The apparatus of claim 2, wherein said measuring heads comprise casings located at the ends of arms extending forwardly of the vehicle.

11. The apparatus of claim 2, wherein said measuring heads comprise casings located at the ends of arms extending rearwardly of the vehicle.

12. The apparatus of claim 2, wherein said measuring heads comprise casings mechanically disconnectable from mounting arms on which they are mounted, so as to modify the mounting configuration of the casings on the vehicles to be inspected.

13. An apparatus for geometric measurement and inspection of wheeled vehicles, comprising:

plural measuring heads adapted to be fixed to wheels of the vehicle being inspected, for determining the physical parameters representative of an individual geometric position of a first wheel relative to a vertical plane or relative to a horizontal plane, and physical parameters representative of relative geometric positions of the first wheel relative to a second wheel of the vehicle being inspected;

a first source of luminous emission fixed to the first wheel and adapted for emitting at least one first substantially horizontal light ray;

a second source of luminous emission fixed to the second wheel and adapted for emitting at least one second substantially horizontal light ray; and at least one means for forming images of said first and second sources of luminous emission on a first optical linear detector fixed to a third wheel of the vehicle being inspected, said first optical linear detector being adapted for receiving the at least one first and second substantially horizontal light rays from said first and second sources of luminous emission respectively, wherein said first optical linear detector is located within a casing and is sensitive to the at least one first and second substantially horizontal light rays produced by said first and second sources of luminous emission outside said casing, and wherein sat first optical linear detector receives at least one substantially horizontal light ray arranged to determine the physical parameters permitting the computation of vertical inclination angles.

14. The apparatus of claim 13, wherein each substantially horizontal light ray is emitted by a source of luminous emission mounted freely pivotally about a fixed axle relative to said first optical linear detector.

15. The apparatus of claim 13, wherein each substantially horizontal light ray is emitted by a source of luminous emission mounted as a pendant on a point fixed relative to said first optical linear detector.

16. The apparatus of claim 13, wherein each substantially horizontal light ray is emitted by a source of luminous emission mounted in fixed position relative to said first optical linear detector and is reflected, diaphragmed or focused by a corresponding member before illuminating said optical linear detector.

17. The apparatus of claim 16, wherein said member is reflecting member mounted pivotally about a fixed axis relative to said source of luminous emission and relative to said first optical linear detector.

18. The apparatus of claim 16, wherein said member is a mask comprising at least one slot for image definition mounted pivotally about an axle fixed relative to said source of luminous emission and relative to said first optical detector.

19. The apparatus of claim 18, wherein said mask comprises two slots for image definition.

20. The apparatus of claim 18, wherein said mask is in the shape of a box comprising two slots disposed on two separate surfaces of the box.

21. The apparatus of claim 19, wherein said mask is suspended by a Cardan mounting, with two degrees of pivotal freedom.

22. The apparatus of claim 13, wherein each substantially horizontal light ray is emitted by a luminous emission source mounted at the end of a flexible strip permitting pivoting, another end of said flexible strip being fixed relative to said first optical linear detector.

23. The apparatus of claim 16, wherein said corresponding member is secured on a resilient flexible blade secured to an end in fixed position relative to said first linear optical detector and carrying at its other end a counterweight.

24. An apparatus for geometric measurement and inspection of wheeled vehicles, comprising:

four measuring casings adapted to be fixed to wheels of the vehicle being inspected, for determining the physical parameters representative of an individual geometric position of a first wheel relative to a vertical plane or relative to a horizontal plane, and physical parameters representative of relative geometric positions of the first wheel relative to a second wheel of the vehicle being inspected;

four optical linear detectors being disposed each in a casing;

two double axis inclinometers disposed in two diagonally opposed casings;

a first source of luminous emission fixed to the first wheel and adapted for emitting at least one first substantially horizontal light ray;

a second source of luminous emission fixed to the second wheel and adapted for emitting at least one second substantially horizontal light ray; and at least one means for forming images of said first and second sources of luminous emission on a first of said four optical linear detectors fixed to a third wheel of the vehicle being inspected, said first optical linear detector being adapted for receiving the at least one first and second substantially horizontal light rays from said first and second sources of luminous emission respectively.

* * * * *